United States Patent
McClennen et al.

(10) Patent No.: US 12,242,645 B2
(45) Date of Patent: Mar. 4, 2025

(54) DATA PRIVACY ARCHITECTURE, SYSTEMS, AND METHODS

(71) Applicant: Truist Bank, Charlotte, NC (US)

(72) Inventors: Chris McClennen, Charlotte, NC (US); Josephine Middleton-Saulny, Atlanta, GA (US); Jennifer Lenette Gray, Smyrna, GA (US); Joseph Matthew Law, Ankeny, IA (US); Giridhar Polur, Cumming, GA (US); Seshadri Chintalapati, Charlotte, NC (US)

(73) Assignee: TRUIST BANK, Charlotte, NC (US)

( * ) Notice: Subject to any disclaimer, the term of this patent is extended or adjusted under 35 U.S.C. 154(b) by 244 days.

(21) Appl. No.: 17/936,652

(22) Filed: Sep. 29, 2022

(65) Prior Publication Data
US 2024/0005029 A1   Jan. 4, 2024

Related U.S. Application Data

(60) Provisional application No. 63/371,657, filed on Aug. 17, 2022, provisional application No. 63/367,426, filed on Jun. 30, 2022.

(51) Int. Cl.
*G06F 21/62* (2013.01)
*G06F 3/0482* (2013.01)

(52) U.S. Cl.
CPC ........ *G06F 21/6245* (2013.01); *G06F 3/0482* (2013.01); *G06F 21/6254* (2013.01)

(58) Field of Classification Search
CPC . G06F 21/6245; G06F 21/6254; G06F 3/0482
See application file for complete search history.

(56) References Cited

U.S. PATENT DOCUMENTS

| | | | |
|---|---|---|---|
| 9,894,050 B1 | 2/2018 | Wright | |
| 11,457,079 B1 | 9/2022 | Mehta | |
| 11,954,225 B1 * | 4/2024 | Guenther | G06F 21/6245 |
| 2012/0331567 A1 | 12/2012 | Shelton | |
| 2013/0185806 A1 | 7/2013 | Hatakeyama | |
| 2014/0379665 A1 | 12/2014 | Benjamin | |
| 2016/0065541 A1 | 3/2016 | Winner | |
| 2020/0067861 A1 * | 2/2020 | Leddy | G06F 21/6245 |
| 2020/0380171 A1 | 12/2020 | Bonat | |
| 2021/0256557 A1 | 8/2021 | Donald | |
| 2021/0312086 A1 * | 10/2021 | Kim | G06F 18/214 |
| 2021/0357517 A1 | 11/2021 | Ramanathan | |
| 2021/0357527 A1 | 11/2021 | Maeng | |
| 2022/0343014 A1 * | 10/2022 | Qiu | G06F 21/6245 |
| 2023/0177206 A1 | 6/2023 | Rolle | |

OTHER PUBLICATIONS

Search History (Year: 2024).

\* cited by examiner

*Primary Examiner* — Kristie D Shingles
(74) *Attorney, Agent, or Firm* — Michael A. Springs, Esq.; Shumaker, Loop & Kendrick, LLP; Patrick B. Horne

(57) ABSTRACT

Systems, apparatuses, and methods for managing privacy of data are provided. The method includes providing at least one database containing user data, at least one processor in communication with the at least one database, a memory device including readable instructions, and at least one user device in communication with the at least one processor via a network connection; receiving at least one preference related to the user data; storing the at least one preference in the at least one database; and using the at least one preference to prevent at least one interaction with the at least one user device.

17 Claims, 25 Drawing Sheets

Privacy Center                                   [Sign Out]

PRIVACY CENTER
<First Name>'s Personal Information

[Sharing Preferences] [Marketing Preferences] [Information requests]

Choose how we contact you

By providing your personal information, we can verify your identity and ensure any updates or requests you make are completed. All fields are required unless noted *(optional)*.

Marketinging   Confirmation
     ①————————②

Opt out of marketing emails and calls

Opt out of email

Select email accounts to be excluded from receiving marketing updates from the bank.

On ⬤ Opt out of email address 1
This email address will no longer receive marketing communications if opted out.
Email
[          ]
○Read-only On ⬤ Opt out of email address 2
This email address will no longer receive marketing communications if opted out.
Email
[          ]
○Read-only

Add more email addresses to opt out of marketing communications
⬤ I would like to opt out of additional emails On ⬤ Opt out of email address 3
This email address will no longer receive marketing communications if opted out.
Email
[          ]
name@email.com On ⬤ Opt out of email address 4
This email address will no longer receive marketing communications if opted out.
Email
[          ]
name@email.com On ⬤ Opt out of email address 5
This email address will no longer receive marketing communications if opted out.
Email
[          ]
name@email.com

FIG. 13

Opt out of phone calls

Select phone numbers to be excluded from receiving marketing updates from the bank.

On ⬤ Opt out of phone number 1
This phone number will no longer receive marketing communications if opted out.
Phone number
○ Read-only On ⬤ Opt out of phone number 2
This phone number will no longer receive marketing communications if opted out.
Phone number
○ Read-only

Add more phone numbers to opt out of marketing communications
⦿ I would like to opt out of phone numbers On ⬤ Opt out of phone number 3
This phone number will no longer receive marketing communications if opted out.
Phone number
xxx-xxx-xxxx On ⬤ Opt out of phone number 4
This phone number will no longer receive marketing communications if opted out.
Phone number
xxx-xxx-xxxx On ⬤ Opt out of phone number 5
This phone number will no longer receive marketing communications if opted out.
Phone number
xxx-xxx-xxxx

Privacy Center [Sign Out]

PRIVACY CENTER
<First Name>'s Personal Information

[Sharing Preferences] [Marketing Preferences] [Information requests]

Choose how we contact you

By providing your personal information, we can verify your identity and ensure any updates or requests you make are completed. All fields are required unless noted *(optional)*.

Marketinging ① ──── Confirmation ②

Opt out of marketing emails and calls

Opt out of email

Select email accounts to be excluded from receiving marketing updates from the bank.

Opt out of email address 1
This email address will no longer receive marketing communications if opted out.
Email
○ Read-only Opt out of email address 2
This email address will no longer receive marketing communications if opted out.
Email
○ Read-only

Add more email addresses to opt out of marketing commumications
⦿ I would like to opt out of additional emails Opt out of email address 3
This email address will no longer receive marketing communications if opted out.
Email
name@email.com Opt out of email address 4
This email address will no longer receive marketing communications if opted out.
Email
name@email.com Opt out of email address 5
This email address will no longer receive marketing communications if opted out.
Email
name@email.com

FIG. 20

Opt out of phone calls

Select phone numbers to be excluded from receiving marketing updates from the bank.

On ⊙ Opt out of phone number 1
This phone number will no longer receive marketing communications if opted out.
Phone number
∘Read-only On ⊙ Opt out of phone number 2
This phone number will no longer receive marketing communications if opted out.
Phone number
∘Read-only

Add more phone numbers to opt out of marketing communications
⦿ I would like to opt out of phone numbers On ⊙ Opt out of phone number 3
This phone number will no longer receive marketing communications if opted out.
Phone number
xxx-xxx-xxxx On ⊙ Opt out of phone number 4
This phone number will no longer receive marketing communications if opted out.
Phone number
xxx-xxx-xxxx On ⊙ Opt out of phone number 5
This phone number will no longer receive marketing communications if opted out.
Phone number
xxx-xxx-xxxx

DATA PRIVACY ARCHITECTURE, SYSTEMS, AND METHODS

CROSS-REFERENCE TO RELATED APPLICATION

This application claims the benefit of U.S. Provisional Patent Application Ser. Nos. 63/367,426, filed Jun. 30, 2022, and 63/371,657, filed Aug. 17, 2022, the entireties of which are herein incorporated by reference.

FIELD

The invention relates generally to data privacy, and more particularly to architecture, systems, and methods for managing data privacy including data privacy protection and consent management.

BACKGROUND

Data privacy, or information privacy, often refers to a specific kind of privacy linked to personal information that is provided from individuals to private enterprises in a variety of different applications. Currently, protections for personal information are sector-specific, including personal health information, educational information, children's information, and financial information, and each has different enforcement mechanisms and unique requirements on consent and disclosure. However, data privacy is ever-evolving in how personal information is used and how it is regulated. The future of data privacy will likely require greater protections and more affirmative rights for individuals.

Accordingly, it would be desirable to develop architecture, systems, and methods for managing data privacy that provide enhanced data privacy protection and consent management.

BRIEF SUMMARY

In concordance and agreement with the present invention, architecture, systems, and methods for managing data privacy that provide enhanced data privacy protection and consent management, have surprisingly been discovered.

In one embodiment, a system for managing data privacy, the system comprises: a computer with one or more processor and memory, wherein the computer executes computer-readable instructions for at least one interaction with at least one user device; and a network connection operatively connecting the user device to the computer; wherein, upon execution of the computer-readable instructions, the computer performs steps comprising: providing at least one database containing user data; receiving at least one preference related to the user data; storing the at least one preference in the at least one database; and using the at least one preference to prevent the at least one interaction with the at least one user device.

As aspects of some embodiments, the at least one preference is a no-interaction preference.

As aspects of some embodiments, the system further comprises the step of providing the at least one preference to at least one application upstream of a data privacy application.

As aspects of some embodiments, the at least one preference is received from a data privacy application.

As aspects of some embodiments, the system further comprises the step of filtering the user data based upon the at least one preference.

As aspects of some embodiments, a filtered user data is provided to a marketing module.

As aspects of some embodiments, the filtering step deletes personal information of a user from the user data.

As aspects of some embodiments, the system further comprises the step of filtering a marketing file of the user data based upon the at least one preference.

As aspects of some embodiments, the filtered marketing file of the user data is provided to a marketing module.

As aspects of some embodiments, the filtering step deletes personal information of a user from the marketing file of the user data.

As aspects of some embodiments, the filtered marketing file is used by at least one agent when distributing marketing materials.

In another embodiment, a method for managing data privacy, comprises the steps of: providing at least one database containing user data, at least one processor in communication with the at least one database, a memory device including readable instructions, and at least one user device in communication with the at least one processor via a network connection; receiving at least one preference related to the user data; storing the at least one preference in the at least one database; and using the at least one preference to prevent at least one interaction with the at least one user device.

As aspects of some embodiments, the at least one preference is a no-interaction preference.

As aspects of some embodiments, a method further comprises the step of filtering the user data based upon the at least one preference.

As aspects of some embodiments, a filtered user data is provided to a marketing module.

As aspects of some embodiments, the filtering step deletes personal information of a user from the user data.

As aspects of some embodiments, the system further comprises the step of filtering a marketing file of the user data based upon the at least one preference.

As aspects of some embodiments, the filtered marketing file of the user data is provided to a marketing module.

As aspects of some embodiments, the filtering step deletes personal information of a user from the marketing file of the user data.

As aspects of some embodiments, the filtered marketing file is used by at least one agent when distributing marketing materials.

The features, functions, and advantages that have been discussed may be achieved independently in various embodiments of the present invention or may be combined in yet other embodiments, further details of which can be seen with reference to the following description and drawings.

BRIEF DESCRIPTION OF THE DRAWINGS

The above-mentioned, and other features and objects of the inventions, and the manner of attaining them will become more apparent and the invention itself will be better understood by reference to the following description of embodiments of the invention taken in conjunction with the accompanying drawings, wherein:

FIGS. 9-22 are example screen shots from the user device generated by the data privacy application, illustrating steps of the methods of FIGS. 8A-8C.

DETAILED DESCRIPTION

Figure 1:
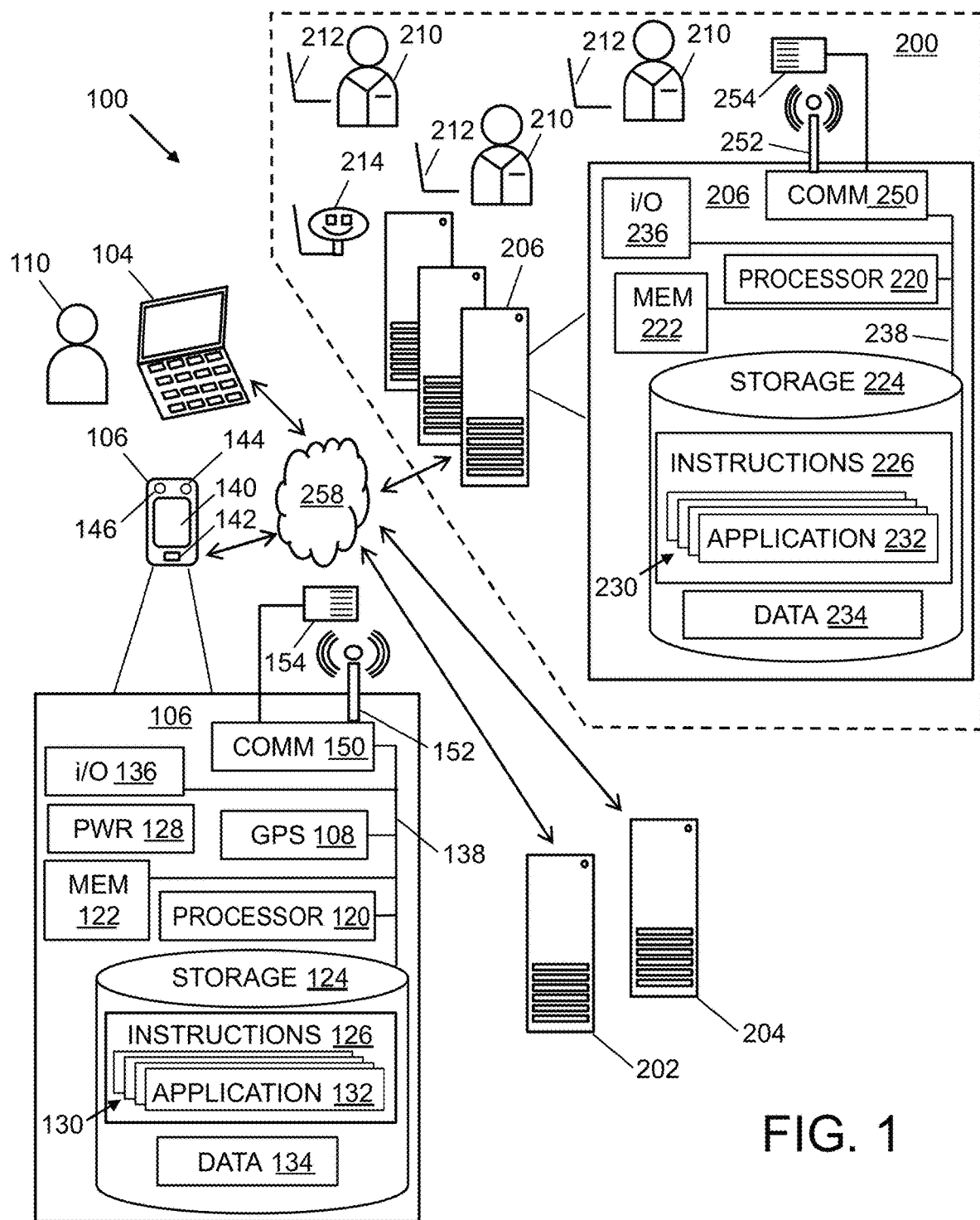
FIG. 1 is a schematic diagram illustrating an enterprise system and environment thereof for implementing a data privacy application in accordance with an embodiment of the presently described subject matter.

Embodiments of the present disclosure will now be described more fully hereinafter with reference to the accompanying drawings, in which some, but not all, embodiments are shown. Indeed, the presently disclosed subject matter may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the subject matter and enable one of ordinary skill in the art to make, use, and practice the subject matter.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present disclosure described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the subject matter. Therefore, it is to be understood that, within the scope of the included claims, the presently described subject matter may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, users, business entities, government entities, clubs, and groups of any size are all within the scope of these descriptions.

The user device, as illustrated with reference to the mobile device 106, includes components such as, at least one of each of a processor or processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application capable of performing the same or similar tasks to the mobile banking system client application. As used hereinafter, each of the software application associated with the enterprise system 200 and the analogous web browser application capable of performing the same or similar tasks are denoted by reference numeral 132, which may refer to a mobile banking system client application capable of operating on either of the user devices 104, 106.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122. For example, the processing device 120 may be capable of operating a connectivity program, such as the previously described web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like. The application 132 related to the enterprise system 200 may be configured to operate in similar fashion for transmitting such web content.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can tender any number or type of services and products to one or more users 110. In some examples, an enterprise system 200 tenders products. In some examples, an enterprise system 200 tenders services. Use of "service(s)" or "product(s)" thus relates to either or both in these descriptions. With regard, for example, to online information and interaction services, "service" and "product" are sometimes termed interchangeably. In non-limiting examples, services and products include retail services and products, information services and products, custom services and products, predefined or pre-tendered services and products, consulting services and products, advising services and products, forecasting services and products, internet products and services, social media, and interaction services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of service (POS) representatives, online user service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at user service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications tendering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processor or processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which a data privacy application 232 is represented as a particular example. The storage device 224 can also store a database 262 (depicted in FIG. 3) of various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts or diagrams expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing system 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the mobile device 104 and computing device 106, the agent devices 212, and the computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, users, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

Figure 2:
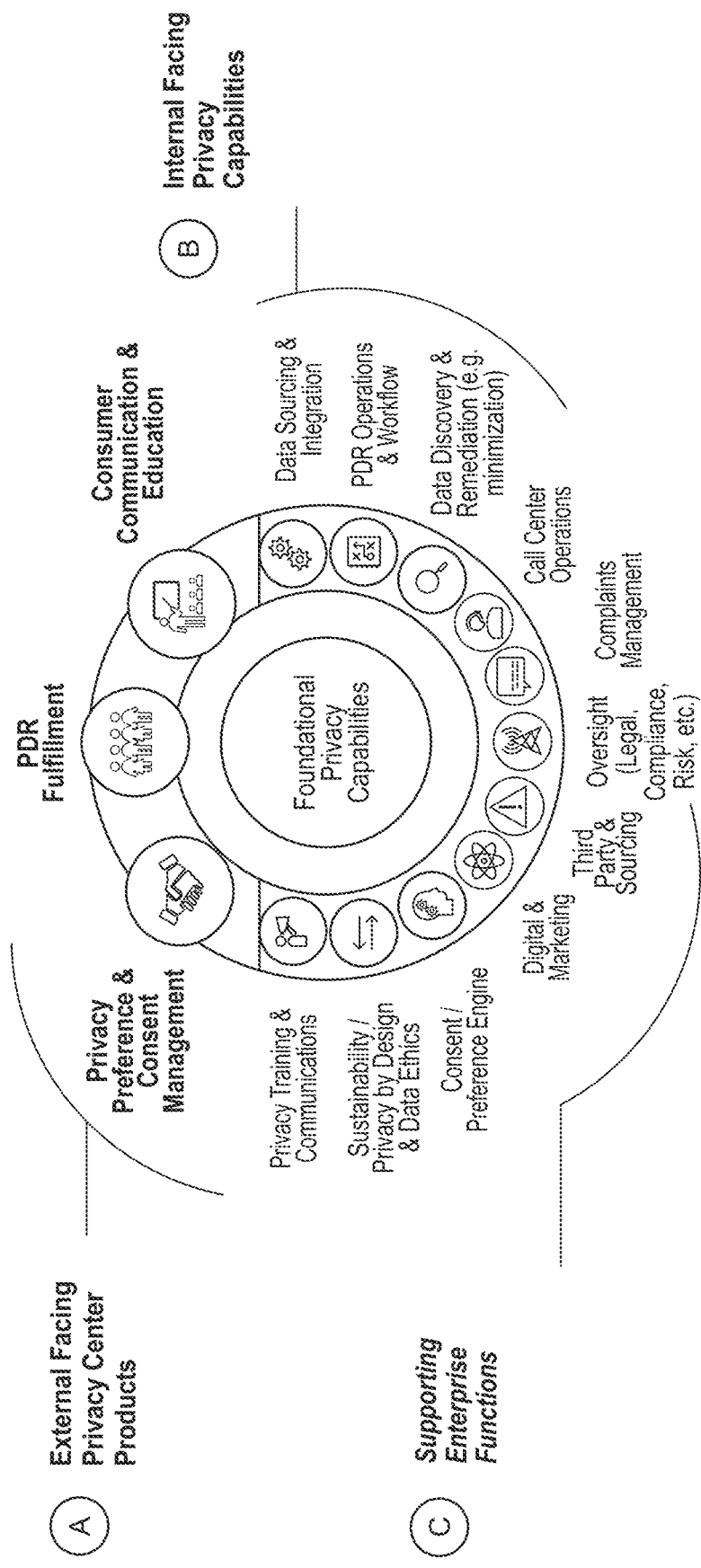
FIG. 2 is a graphical representation of high-level capabilities of the data privacy application including external facing privacy center products, internal facing privacy capabilities, and supporting enterprise functions.

As discussed hereinabove, one of the programs 230 of the enterprise system 200 may be the data privacy application 232, a preferred architecture of which is shown in FIG. 2. The data privacy application 232 may be used by an enterprise to provide the users 110 with increased transparency, control, and insights into use and protection of their personal information.

In an embodiment, the system 200 is caused to allow defining a plurality of preferences corresponding to plurality of fields of the first data privacy application 232, where the plurality of fields may include sensitive data associated with a user profile. The sensitive data may include personally identifiable information (PII) data and domain specific data. Herein, the PII data may refer to the data that may be utilized for determining identity of the user. Examples of fields including the PII data in case of a finance data privacy application 232 may include permanent account numbers, date of birth, e-mail address, residential address, and mobile numbers, for example. The domain specific data includes the data that can pose a risk or affect the user 110 financially or otherwise, if disclosed in public. In an embodiment, the domain specific data may include domain specific fields, and can be generated by the enterprise. Examples of said domain specific data for a financial institution such as a bank may include financial information such as debit and/or credit card numbers, CVV number, account balance, card expiry date, and other such fields, for example.

FIG. 2 provides high-level capabilities of the data privacy application 232 including external facing privacy center products, internal facing privacy capabilities, and supporting enterprise functions. The external facing privacy center products are generally provided to the users 110 through the user devices 106, whereas the internal facing privacy capabilities and supporting enterprise functions are generally conducted within the enterprise by the enterprise system 200.

Figure 3:
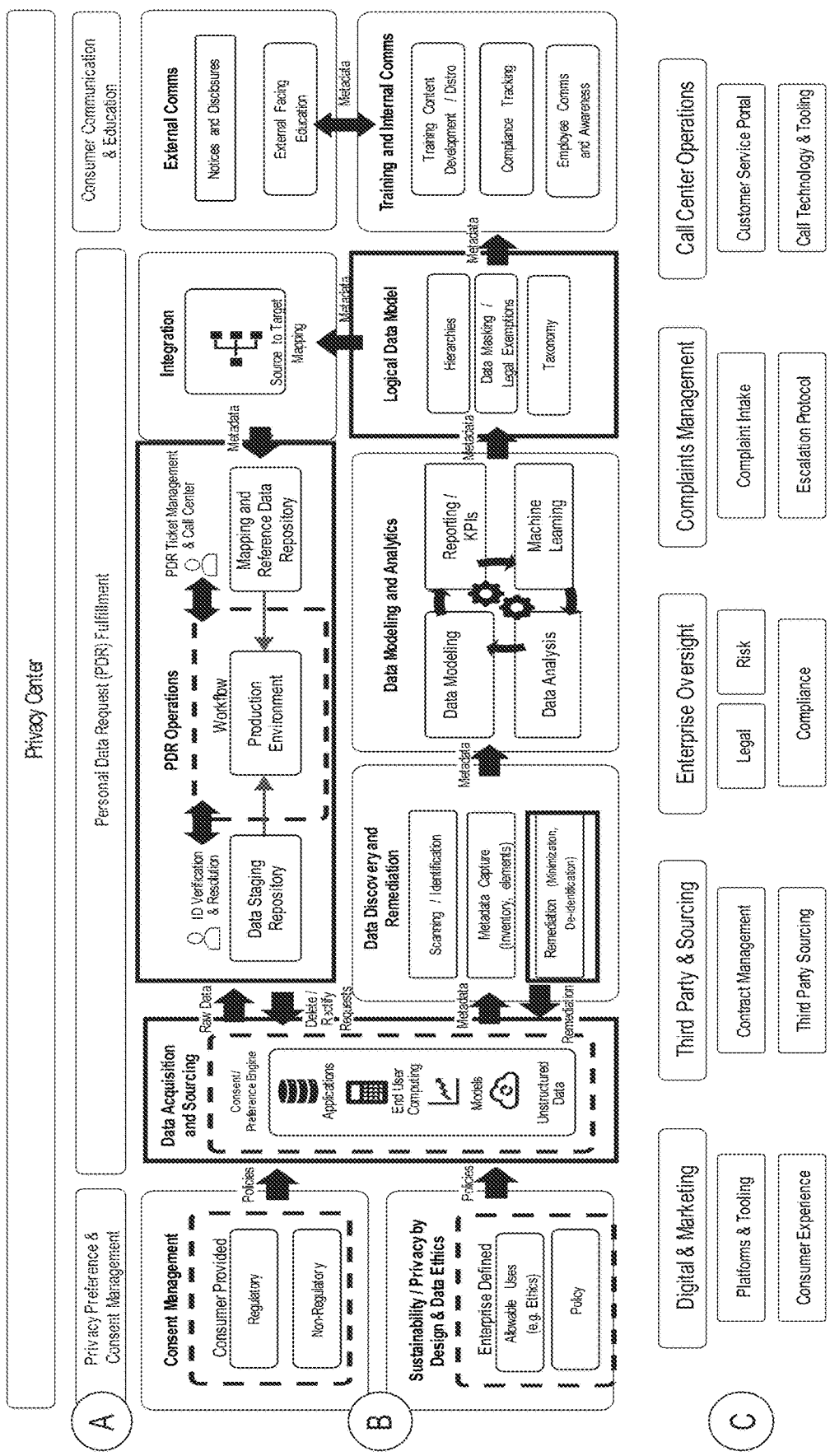
FIG. 3 is a graphical representation of a framework of the external facing privacy center products of FIG. 2, including privacy preferences and consent management module, personal data request (PDR) fulfillment module, and consumer communication and education module.
Figure 4:
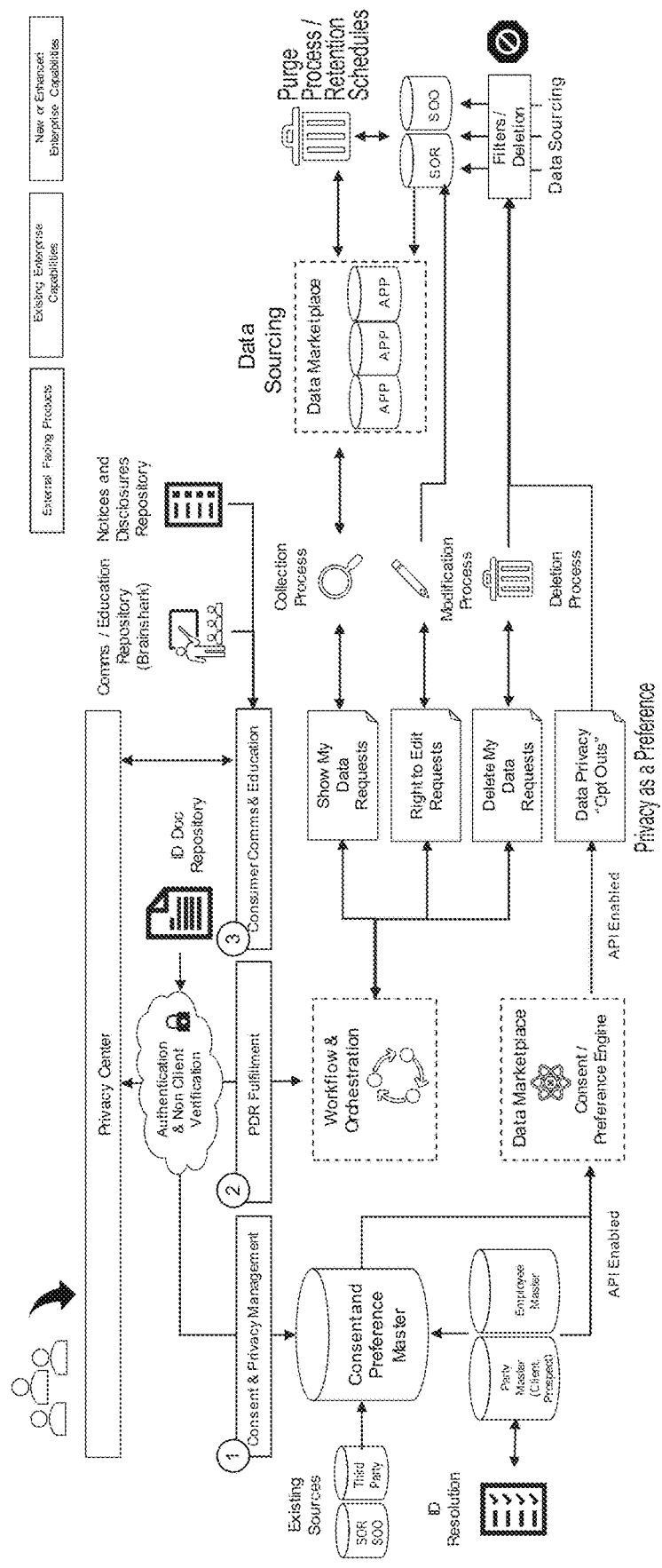
FIG. 4 is a graphical representation of data and technology integration of the external facing privacy center products of FIG. 2.

Referring now to FIGS. 3 and 4, a framework and integration of the external facing privacy center products with the internal facing privacy capabilities and supporting enterprise functions of FIG. 2, in accordance with an embodiment of present disclosure, is shown. The framework shows a relationship of a privacy preferences and consent management (PPCM) module, personal data requests (PDR) fulfillment module, and consumer communication and education module of the external facing privacy center products with capabilities of the enterprise. In some embodiments, the PPCM module relates to a consent management and sustainability/privacy by design, and data ethics capabilities of the enterprise. The capabilities of the enterprise relating to the PDR fulfillment module include data acquisition and sourcing, PDR operations, data discovery and remediation, data modeling and analytics, integration, and logical data model. Within the consumer communication and education module, the capabilities of the enterprise include external communications, training, and internal communications. Digital and marketing, third party and sourcing, enterprise oversight, complaints management, and call center operations may be employed to support the operations of the enterprise related to the data privacy application 232.

Figure 5:
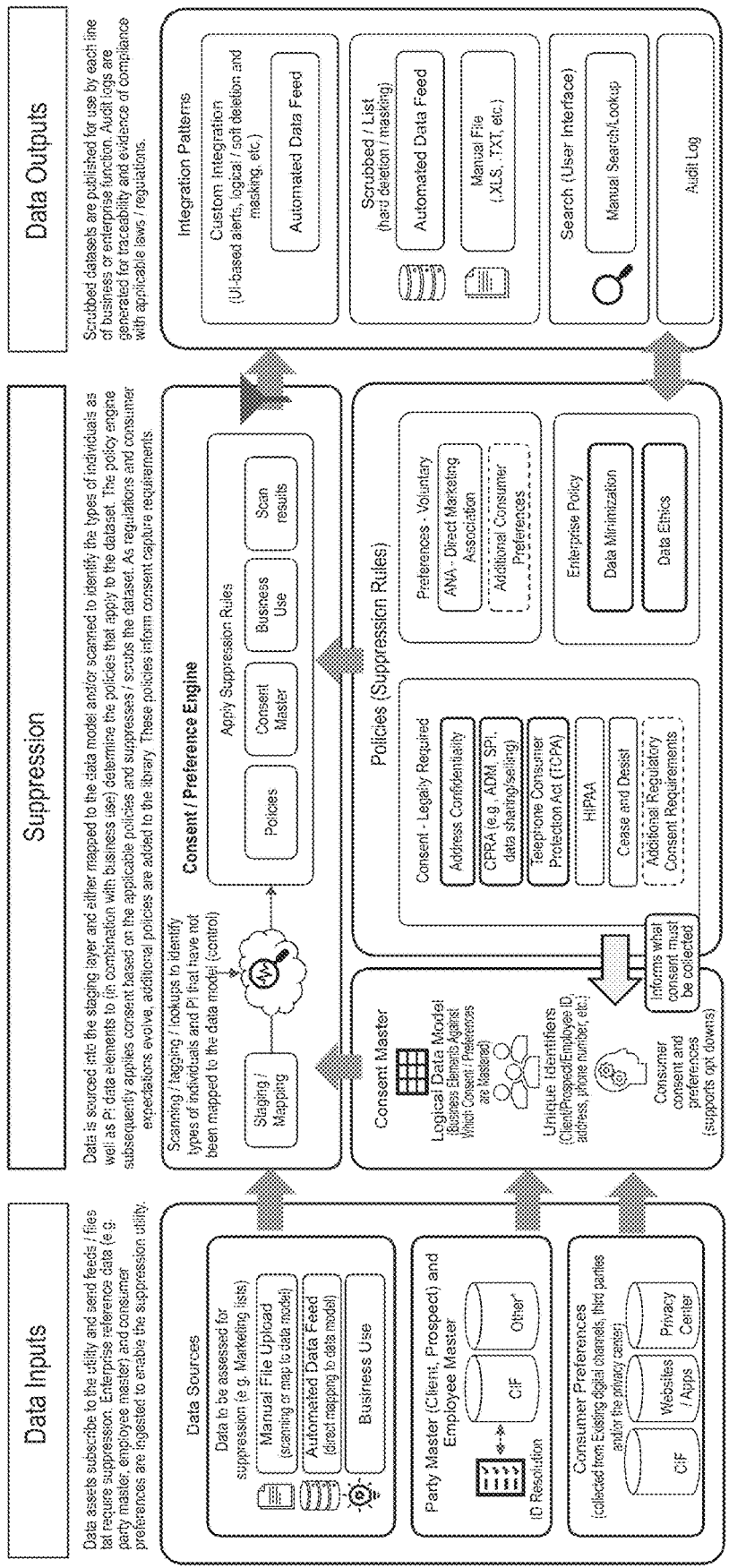
FIG. 5 is a graphical representation illustrating a data flow architecture of the privacy preferences and consent management module of FIG. 2.

FIG. 5 is a graphical representation illustrating a data flow architecture of the privacy PPCM module of FIG. 2 according to an embodiment of the presently described subject matter. As depicted, data provided by various data sources is transmitted to a consent/preference engine via a consent master. Within the consent/preference engine, suppression rules are applied to the data and the data is scrubbed. The scrubbed data may then be outputted and used by the enterprise system 200.

Figure 6:
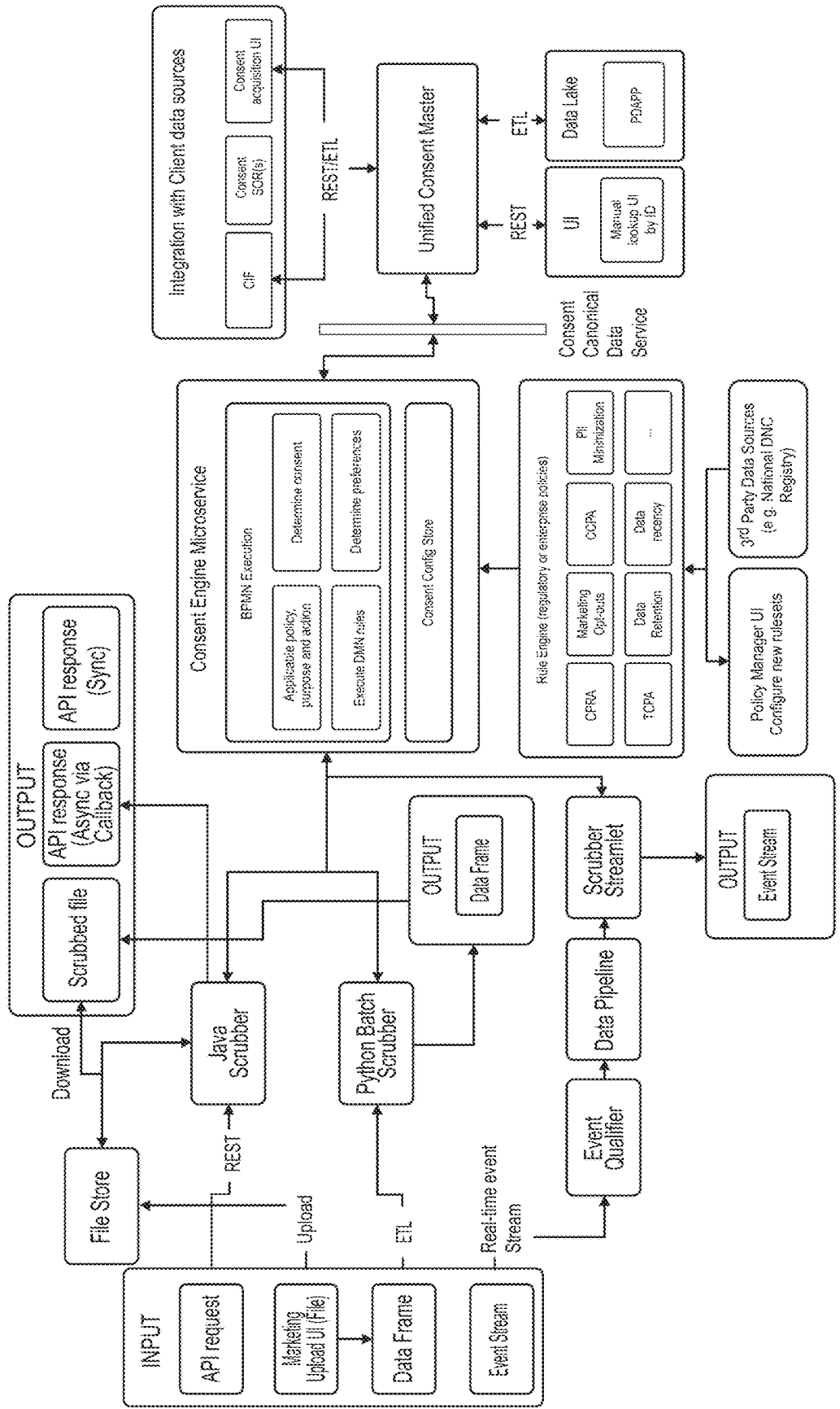
FIG. 6 is another graphical representation illustrating a system architecture of the privacy preferences and consent management module of FIG. 2.

FIG. 6 is another graphical representation illustrating a system architecture of the PPCM module of FIG. 2. Features of the PPCM module include, but are not limited to ingest and store existing and unique user identifiers, (e.g. user ID, postal address, phone numbers, email address), global opt-outs for marketing communications (e.g. email, phone call, text, direct mail) and California Privacy Rights Act (CPRA) opt-outs (e.g. third party sharing/selling, affiliate sharing/selling, limited use of sensitive personal data, automated decision making) via batch and real-time application program interfaces (APIs); establish a single view of user consent and preferences, aligned to unique user identifiers (e.g. user ID, postal address, phone number, email address); enable front-end user interfaces and other programs/applications of the enterprise system 200 to read and write to a consent master via API or batch. Outputs via batch may include a consent master extract; define and manage technical rules based on approved requirements of the enterprise for global marketing opt-outs and/or CPRA opt-outs, to enable processing and suppression of data based on user 110 provided consent and preferences; apply decision and, as required, either flag or suppress, scrub, and/or filter records based on user consent and preferences and the applicable rules; enable a manual search by a unique ID to return a user's consent and preference data; and enable a manual upload of marketing lists (e.g. email address, phone numbers, and/or postal addresses) to determine eligibility for marketing communications based on user provided consent and preferences.

In the embodiment shown in FIG. 6, the unified consent master refers to a data model and associated data structures to store and manage privacy choice submissions of one or more authenticated users and/or one or more unauthenticated users. It is understood that the users 110 may include the authenticated users and/or the unauthenticated users.

The consent canonical data service refers to the API services used to access the unified consent master to store, update or retrieve data for the users 110. The API services can handle a single record request, import files from downstream systems to be stored in the master and export a file from the master to send to downstream systems.

The consent engine refers to the microservice used to determine consent via applying privacy selections/consent against applicable rules sets (e.g. CPRA, Telephone Consumer Protection Act (TCPA), California Consumer Privacy Act (CCPA), global marketing, and the like) to determine if consent is conditional, denied or unconditional. The consent engine stores all the business logic to determine the flow and rules to execute based on the consent action type, subtype and purpose provided in the request. The service returns a response to downstream systems such as a data filter (e.g. a scrubber) for scrubbing/remediating the file or API response.

The rules engine refers to the repository of rules in the form of files. These files are configurable based on the business rules provided.

The data filter is a utility responsible for interacting with the marketing upload UI, file storage and handling direct API requests to the utility. The data filter performs the necessary validation and transformation steps to send the request to the consent engine for processing. Based on the response returned from the consent engine, the data filter applies any necessary remediation to make the payload compliant to grant consent (e.g. obfuscating personal information)

The manual lookup UI is a user interface for users 110 to retrieve the privacy selections (consent/preferences) of the users 110 from the consent master by querying with a unique ID to return the result in a read-only interface.

The marketing upload UI is a user interface for users 110 to upload a marketing file for scrubbing/remediating by the consent utility and get a filtered file returned for download. The users 110 have the ability to select/upload the file, provide metadata for the request (action/purpose), retrieve a filtered file and view previously filtered files.

Figure 7:
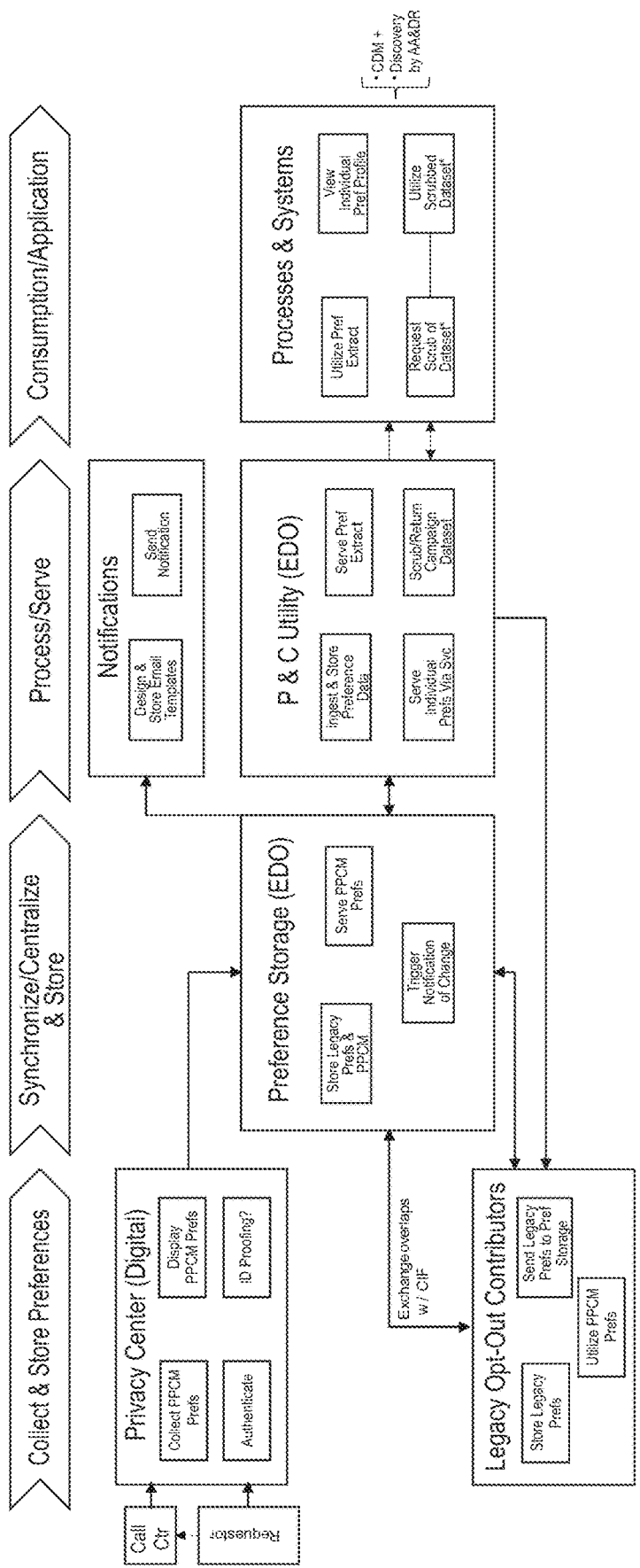
FIG. 7 is high-level process flow diagram of the privacy preferences and consent management module of FIG. 2.

FIG. 7 is high-level process flow diagram of the PPCM module of FIG. 2. In some embodiments, the PPCM module allows the authenticated users 110 to view existing preferences and set preferences. The authenticated users 110 may be an individual and/or entity that has an online user ID. The unauthenticated users 110 (e.g. guests) may be allowed to set preferences, but not view preference history. User preferences may include limitations to how the personal information of the users 110 may be used by the enterprise and/or the enterprise system 100. A notification may be transmitted to the users 110 indicating that a change to their preferences has occurred. In certain embodiments, the user preferences may be used in the enterprise system 200 as suppression rules and/or criteria in other programs and applications of the enterprise system 200 such as marketing systems and applications, for example.

Figure 8A:
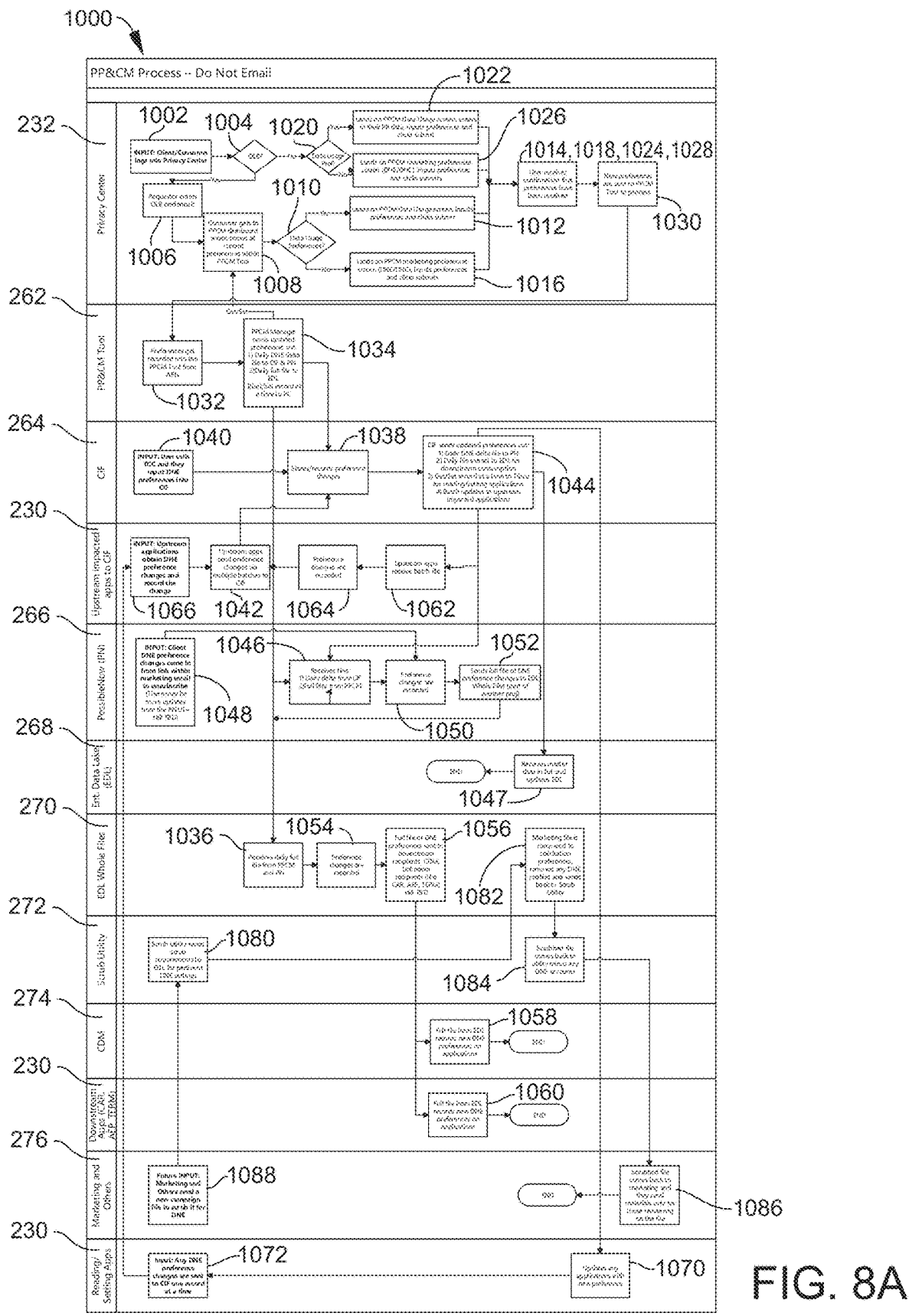
FIGS. 8A-8C are flow charts illustrating methods for setting privacy preferences and consent management by a user via a user device according to at least one embodiment.
Figure 8B:
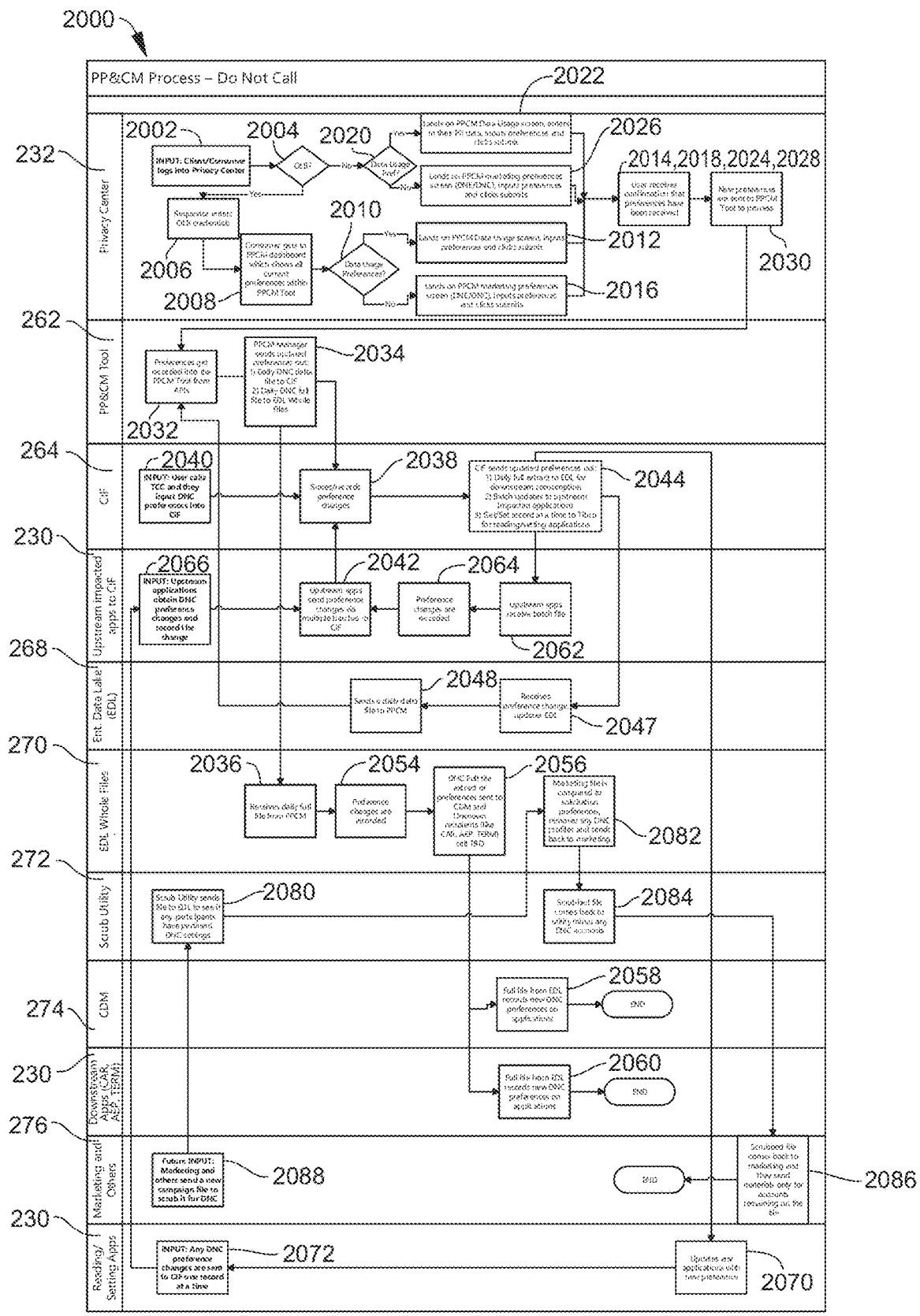
Figure 8C:
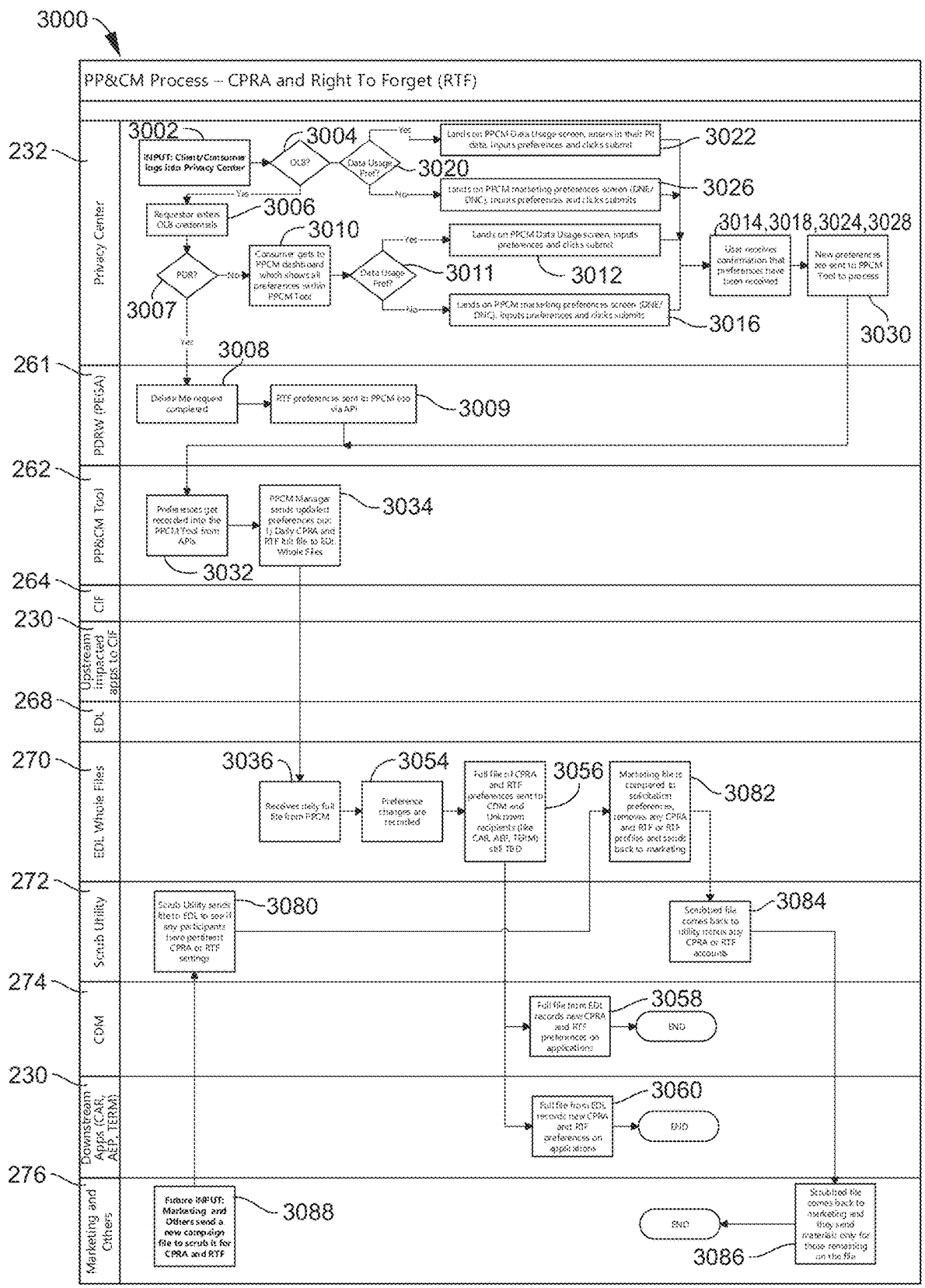

FIGS. 8A-8C are flow diagrams depicting example methods 1000, 2000, 3000, respectively, for managing data privacy in accordance with an embodiment. The methods 1000, 2000, 3000 depicted may be executed by an application of a system, for example, the data privacy application 232 of the enterprise system 200 of FIG. 1. In an example embodiment, the data privacy application 232 may be accessed via a computing device, for example, the computing device 104 and/or the mobile device 106 of the user 110 of FIG. 1.

Operations of the method, and combinations of operation in the method, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the method.

In some embodiments, the method 1000 may be a non-verbal interaction control process (i.e., a "Do-Not-Email" (DNE) process) and include steps for controlling non-verbal interaction preferences of the users 110. As depicted in FIG. 8A, the data privacy application 232 may utilize and/or be in communication with the PPCM module 262, a customer information file (CIF) 264, at least one of the applications 230 upstream of the data privacy application 232, at least one third-party system 266, an enterprise data lake (EDL) 268, EDL whole files 270, a data filter 272, a custom data module (CDM) 274, at least one of the applications 230 downstream of the data privacy application 232, and a marketing module 276. It should be appreciated that the data privacy application 232 may utilize more or less of the applications 230 and/or the systems 202, 204 of the enterprise system 200.

Figure 9:
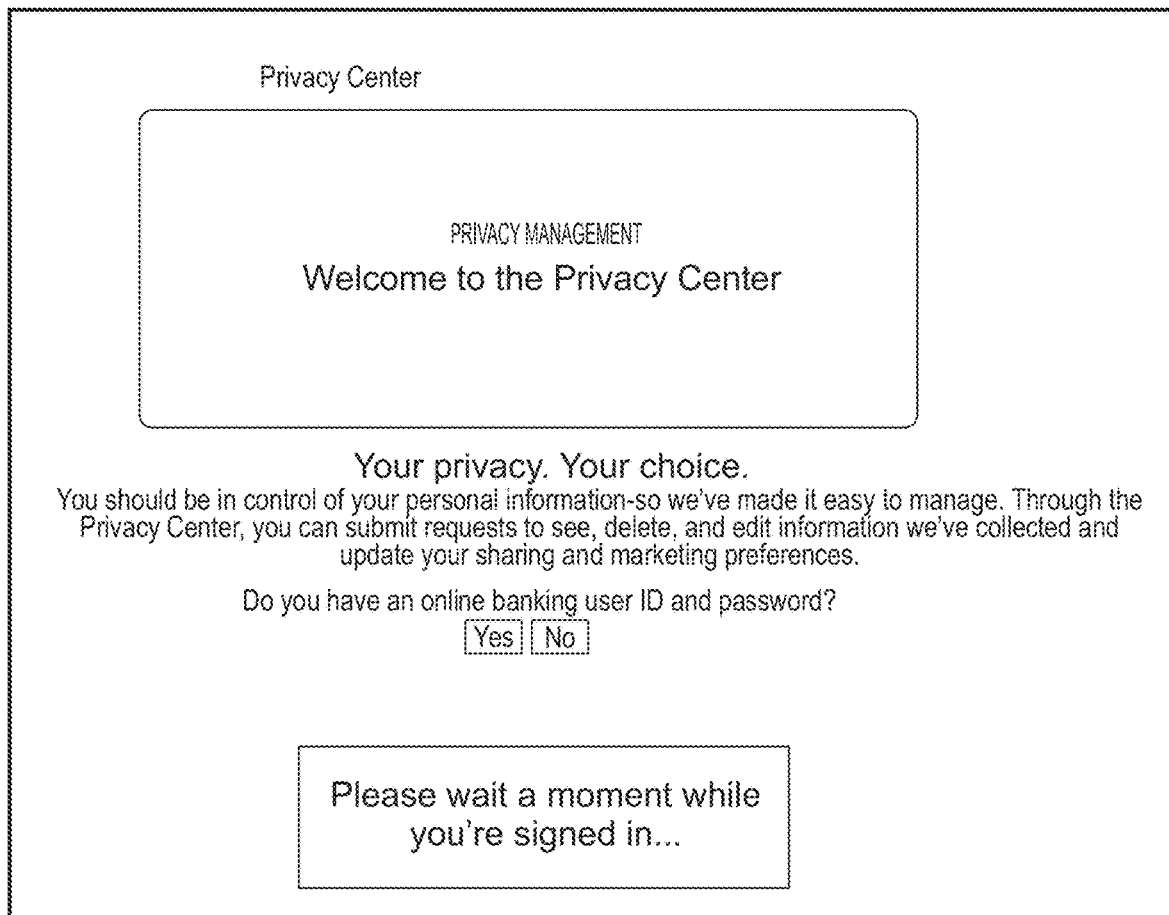
Figure 10:
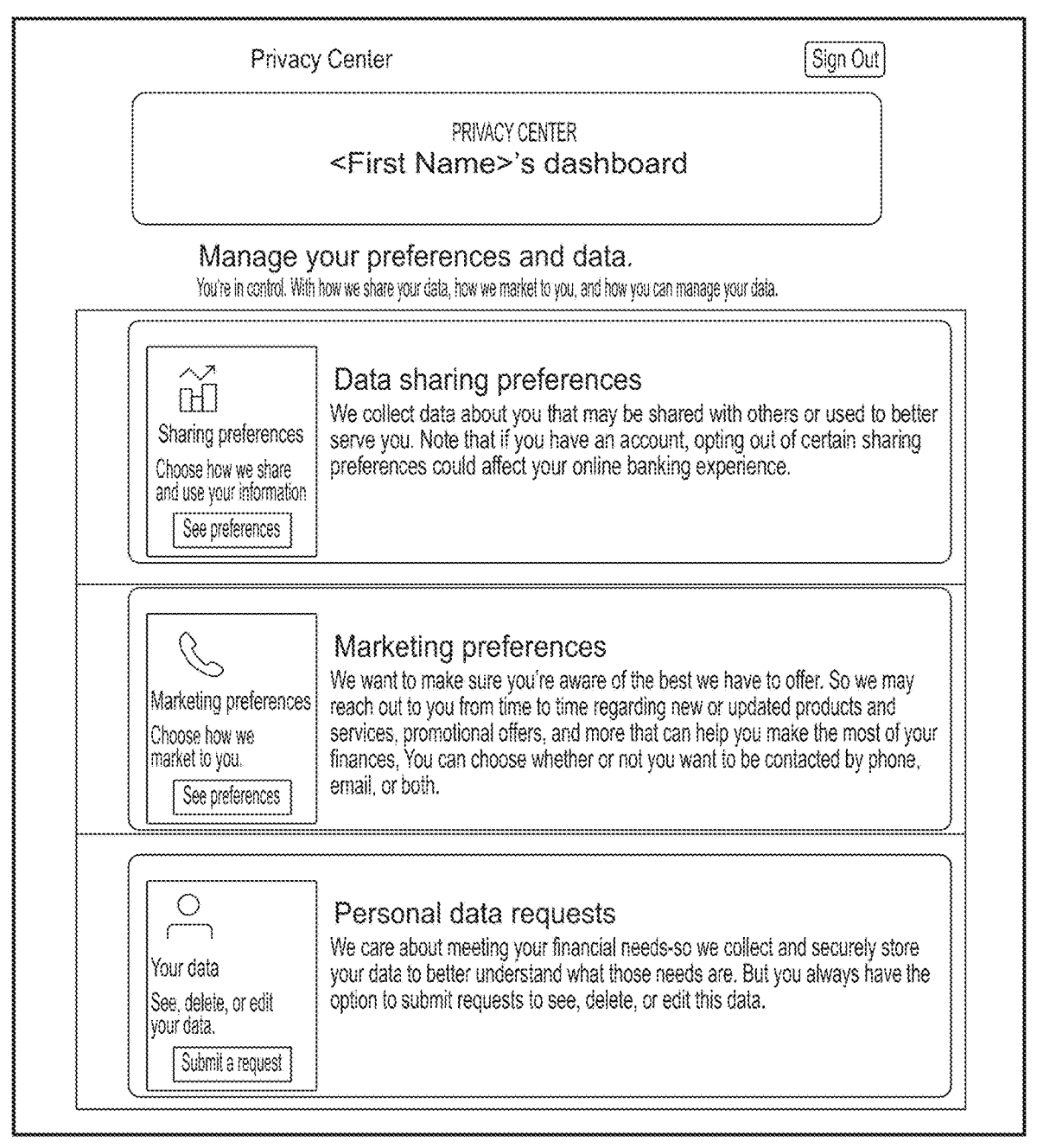

In step 1002 of the method 1000, the user 110 executes the data privacy application 232 using the computing device 104 and/or the mobile device 106. In step 1004, the user 110 selects determines whether to log into the data privacy application 232 as an existing online banking authenticated user or as an unauthenticated user. An example of an input screen of a user interface is shown in FIG. 9. To proceed as the authenticated user, the user 110, in step 1006, inputs credentials into the data privacy application 232. Once the privacy data application 232 authenticates the credentials of the user 110, in step 1008, a personal dashboard is provided as shown in FIG. 10. The personal dashboard may include current non-verbal interaction preferences of the user 110.

Figure 11:
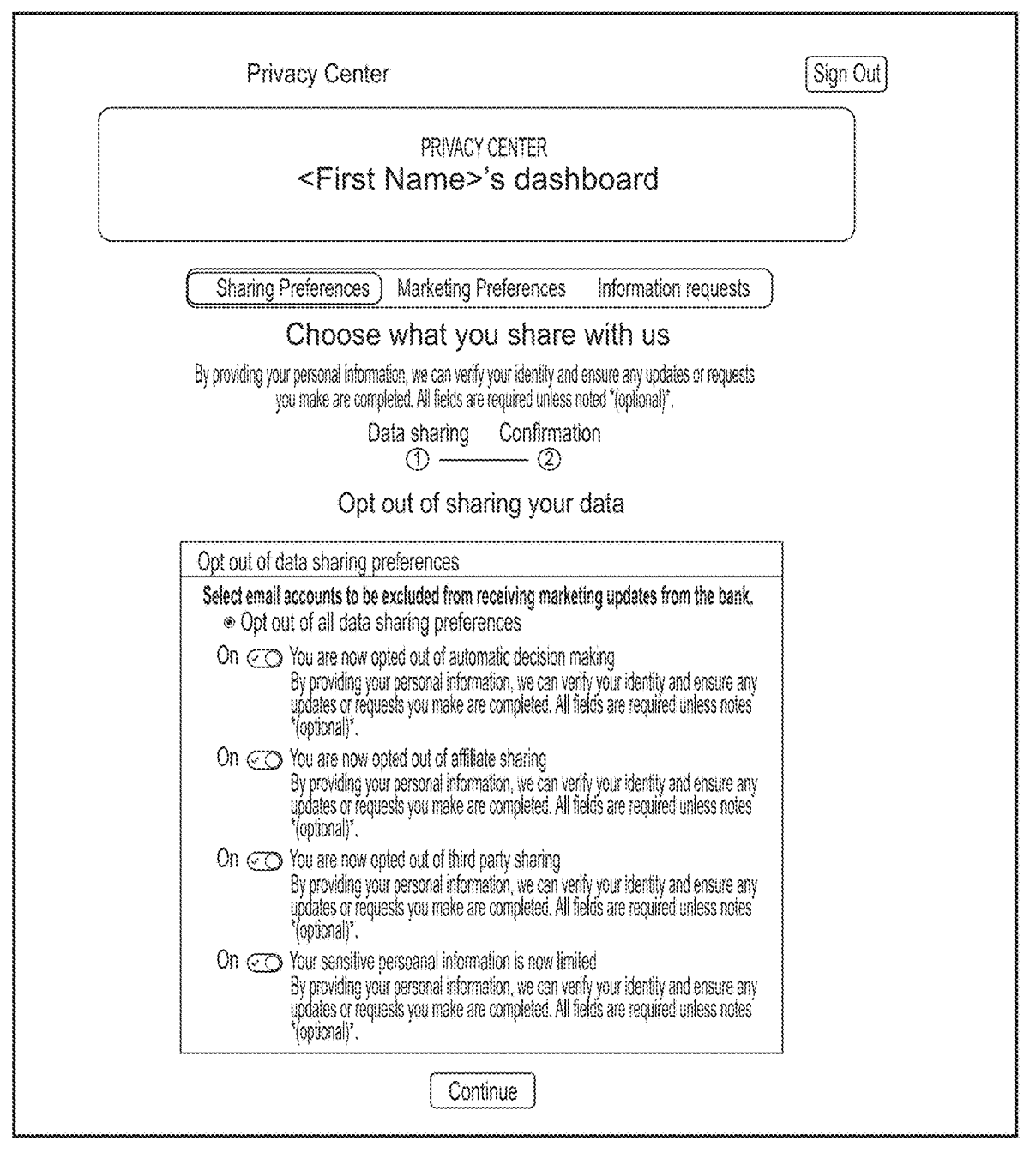
Figure 12:
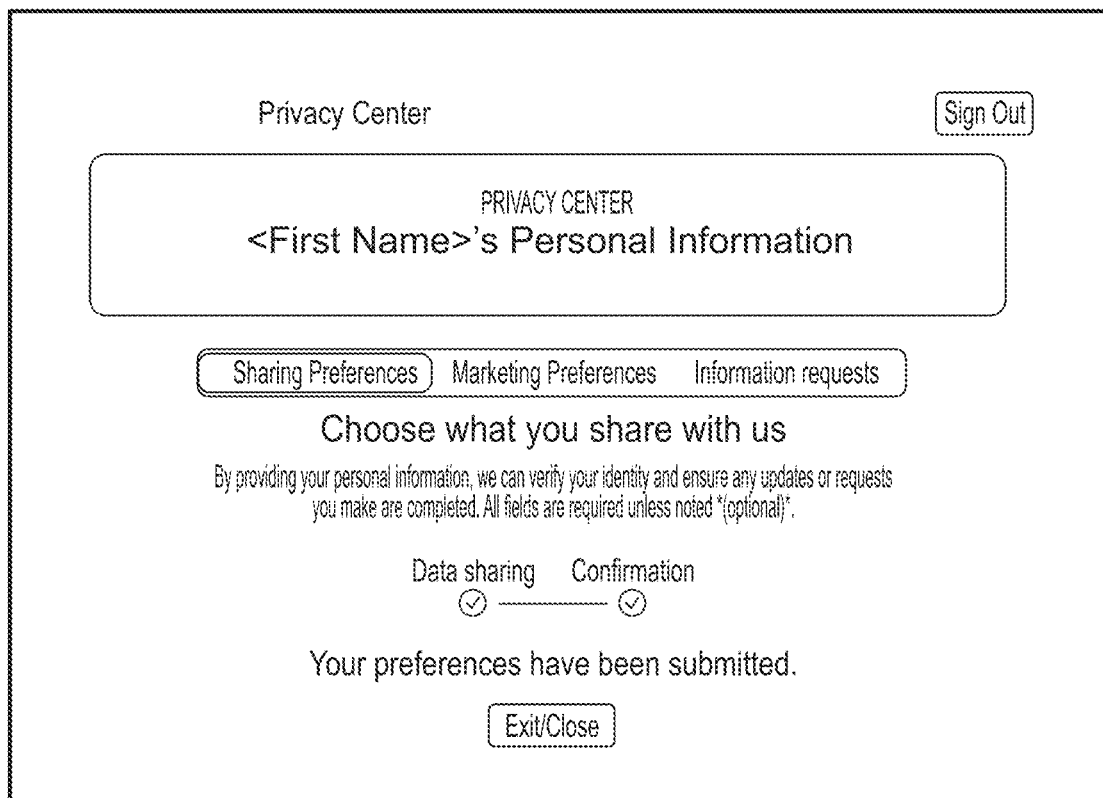
Figure 15:
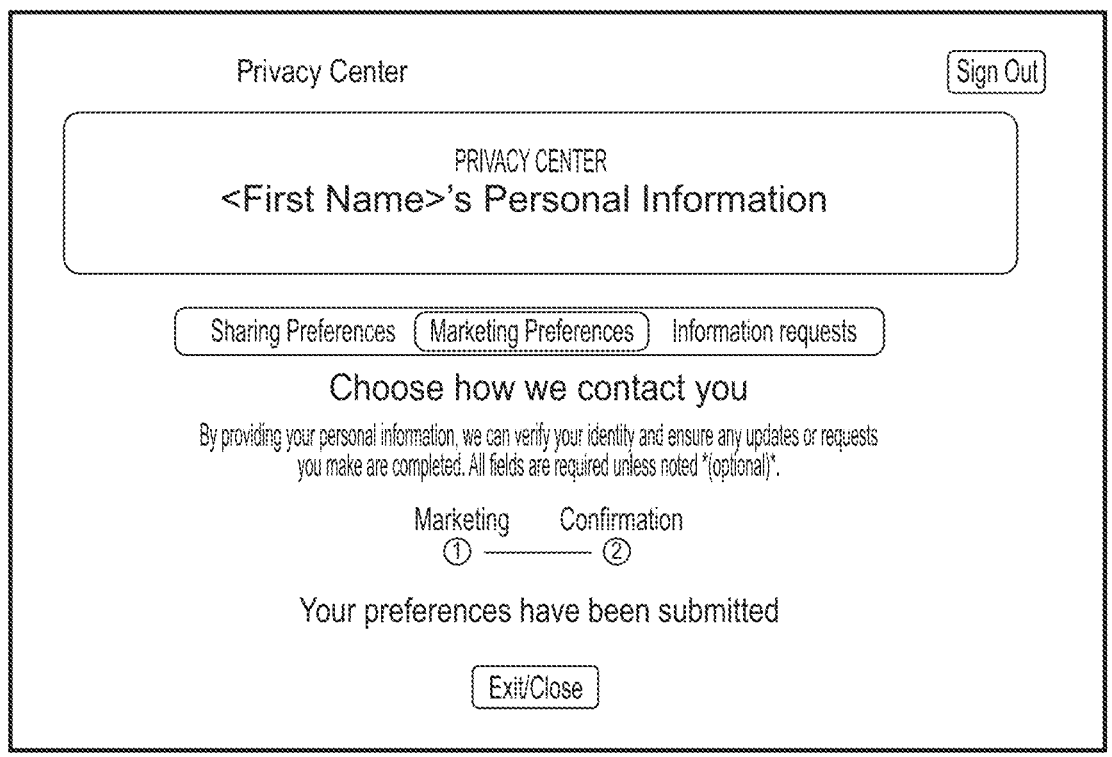

From the personal dashboard, in step 1010, the user 110 selects which non-verbal interaction preferences and data to manage. When data sharing preferences are selected, the user 110, in step 1012, is then able to set those non-verbal interaction preferences, for example, the opt-out data sharing preferences shown in FIG. 11. Upon setting of the data sharing preferences, the user 110 submits the non-verbal interaction preferences. Thereafter, in step 1014, the user 110 receives confirmation that the non-verbal interaction preferences and data have been submitted. An example of a confirmation screen of the user interface is shown in FIG. 12. The user 110 may then close the selected non-verbal interaction preferences and data and return to manage other preferences and data, and/or logout of the data privacy application 232. When marketing preferences are selected, the user 110, in step 1016, is then able to set those non-verbal interaction preferences, for example, the opt-out marketing emails shown in FIGS. 13 and 14. Upon setting of the marking preferences, the user 110 submits the non-verbal interaction preferences. Thereafter, in step 1018, which may be substantially similar to step 1014, the user 110 receives confirmation that the non-verbal interaction preferences and data have been submitted. An example of a confirmation screen of the user interface is shown in FIG. 15. The user 110 may then close the selected non-verbal interaction preferences and data and return to manage other preferences and data, and/or logout of the data privacy application 232.

Figure 16:
Figure 17:
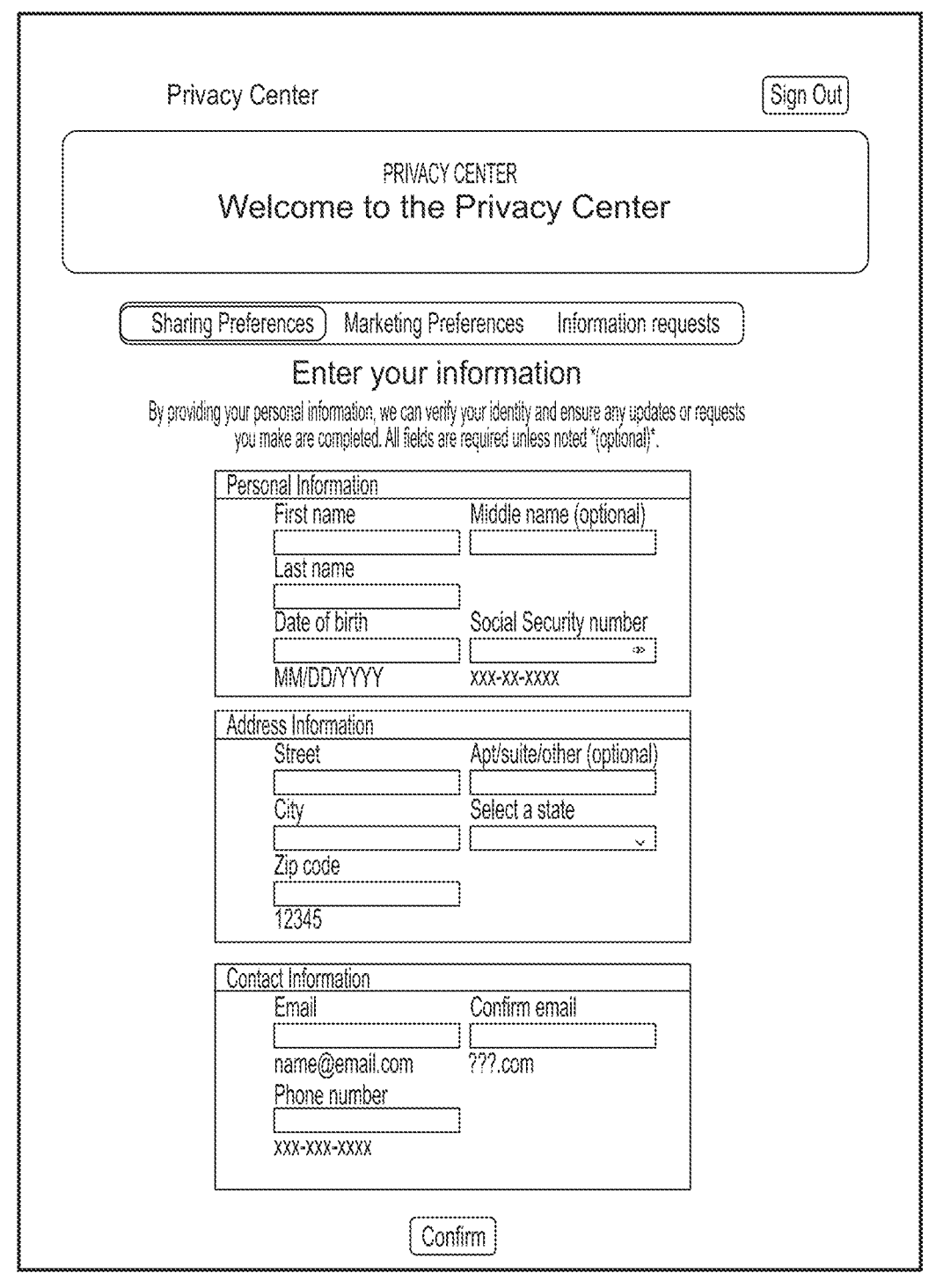
Figure 18:
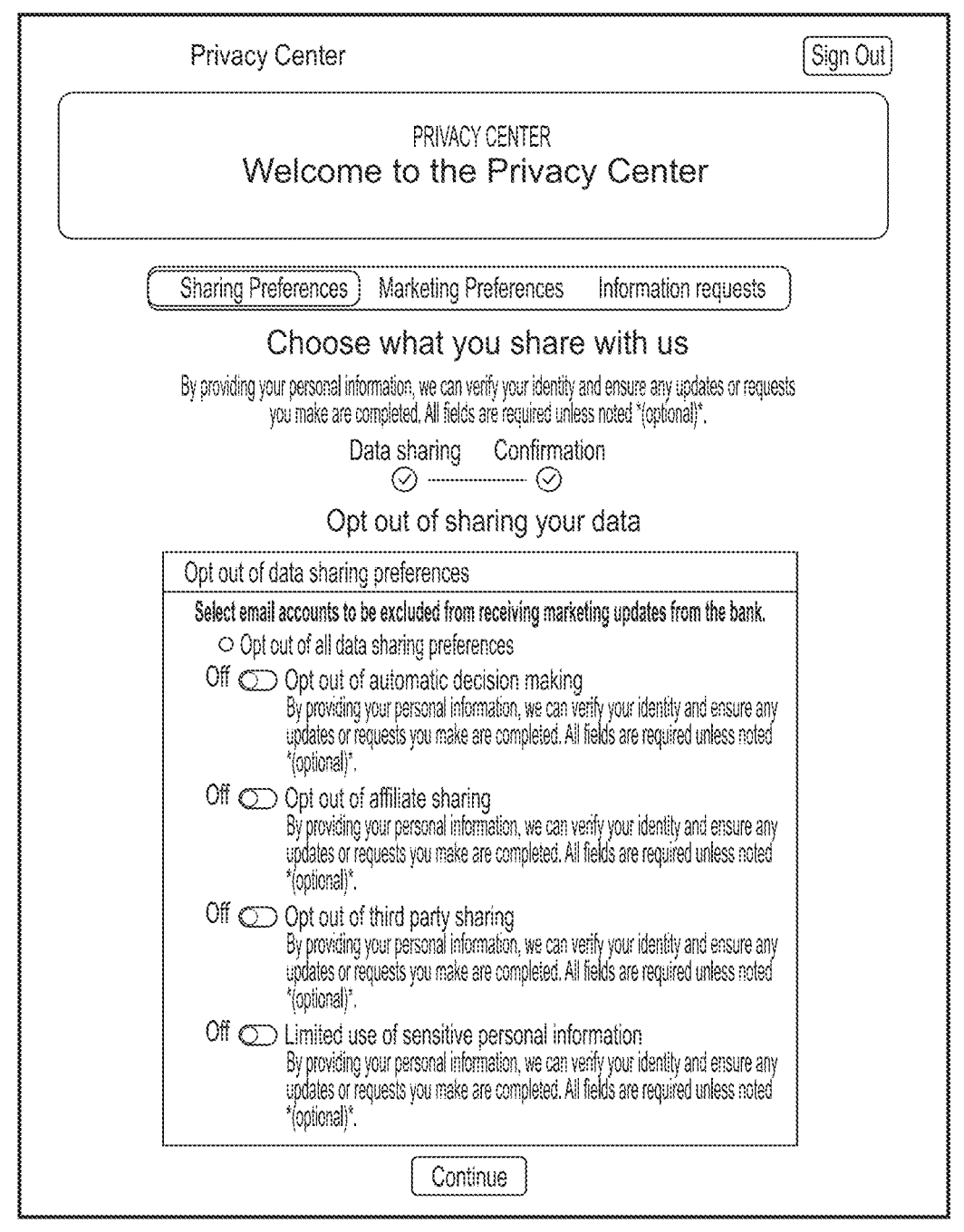
Figure 19:
Figure 22:
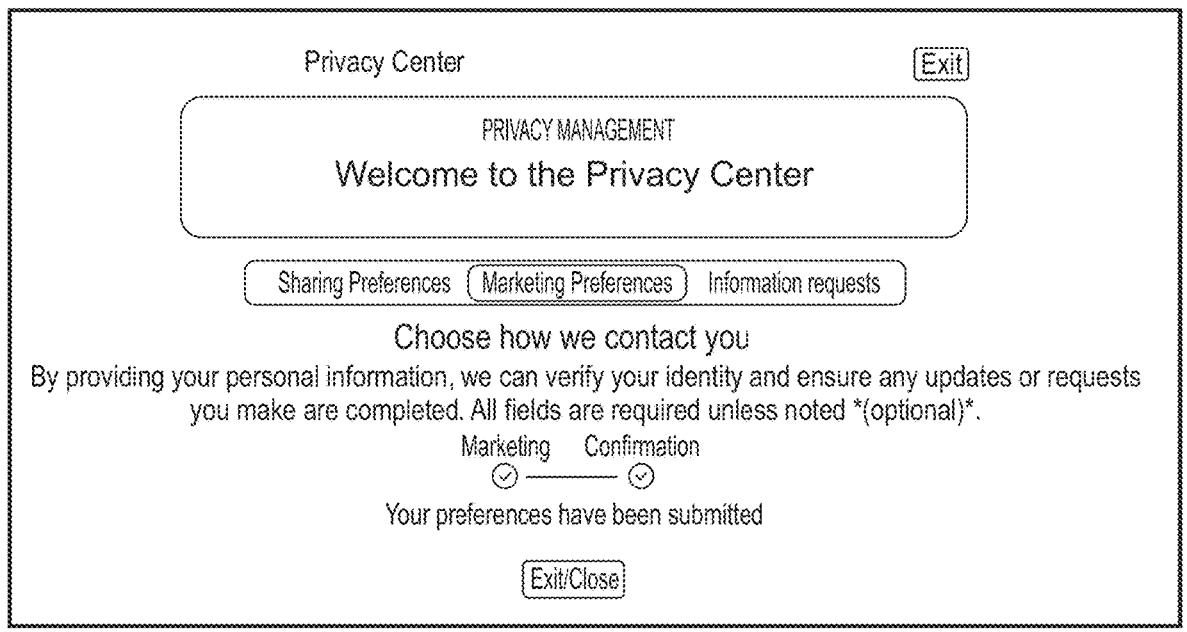

When the user is logged in as an unauthenticated user or guest, a generic dashboard is provided as shown in FIG. 16. From the generic dashboard, the user 110, in step 1020, selects which non-verbal interaction preferences and data to manage. When data sharing preferences are selected, the user 110, in step 1022, is then prompted to enter personal information. One example of an input screen of the user interface is shown in FIG. 17. Once the personal information is entered, the user 110 is then able to set the data sharing preferences, for example, the opt-out data sharing preferences shown in FIG. 18. Upon setting of the data sharing preferences, the user 110 submits the non-verbal interaction preferences. Thereafter, the user 110, in step 1024, which is substantially similar to steps 1014, 1018, receives confirmation that the non-verbal interaction preferences and data have been submitted. An example of a confirmation screen of the user interface is shown in FIG. 19. The user 110 may then close the selected non-verbal interaction preferences and data and return to manage other preferences and data, and/or logout of the data privacy application 232. When marketing preferences are selected, the user 110, in step 1026, is not prompted for personal information, but is able to immediately set those non-verbal interaction preferences, for example, the opt-out marketing emails shown in FIGS. 20 and 21. Upon setting of the marking preferences, the user 110 submits the non-verbal interaction preferences. Thereafter, the user 110, in step 1028, which is substantially similar to steps 1014, 1018, 1024, receives confirmation that the non-verbal interaction preferences and data have been submitted. An example of a confirmation screen of the user interface is shown in FIG. 22. The user may then close the selected non-verbal interaction preferences and data and return to manage other preferences and data, and/or logout of the data privacy application 232.

In step 1030, the non-verbal interaction preferences of the user 110 are then transmitted to the PPCM module 262, where they are received and recorded into the PPCM module 262 from APIs in step 1032. A PPCM manager of the PPCM module 262, at step 1034, may transmit at least a portion of the non-verbal interaction preferences as: i) a daily non-verbal interaction preferences delta file including the non-verbal interaction preference changes to at least one of the CIF 264 at step 1038 and the at least one third-party system 266 at step 1046; ii) a daily full file to at least one of the EDL whole files 270 at step 1036; and/or iii) a complete file to the storage 224 of the enterprise system 200 to be accessed by the data privacy application 232 in order to provide the current non-verbal interaction preferences of the user 110 on the personal dashboard during the step 1008. When the daily full file is transmitted to the EDL whole files 270 from the PPCM module 262 at step 1036, it may be received therein.

When the daily non-verbal interaction preferences delta file is transmitted to the CIF 264 from the PPCM module 262, it may be received and recorded therein at step 1038. The user 110, in step 1040, may communicate with a telephone call center (TCC), which may input non-verbal interaction preferences into the CIF 264. The recorded file stored in the CIF 264 may also be updated with the non-verbal interaction preferences received, via one or more batches, from the at least one of the applications 230 upstream of the data privacy application 232 at step 1042.

In the CIF 264, at step 1044, may transmit at least a portion of the non-verbal interaction preferences as: i) a daily non-verbal interaction preferences delta file including the non-verbal interaction preference changes to the third-party systems 266 at step 1046; ii) a daily full file to the EDL 268, at step 1047, for use by the at least one of the applications 230 downstream of the data privacy application 232; iii) a complete file to the storage 224 of the enterprise system 200 to be accessed by one or more of the applications 230 such as a reading application and a setting application; and/or iv) a batch file for use by the at least one of the applications 230 upstream of the data privacy application 232 at step 1062.

At step 1046, the at least one third-party system 266 may receive and record at least one of the daily non-verbal interaction preferences delta file including the non-verbal interaction preference changes from the CIF 264 and the daily full file from the PPCM module 262. The user 110, in step 1048, may communicate with preference changes from a link within marketing emails to unsubscribe which are transmitted to the third-party system 266. Then, at step 1050, the preference changes from steps 1046 and 1048 are recorded within the at least one third-party system 266. The complete non-verbal interaction preferences file including the preference changes and the daily full file received from the CIF 264 at step 1036 is transmitted and recorded to the EDL whole files 270 at step 1050. Then, at step 1054, the preference changes are recorded within the EDL whole files 270. Thereafter, the full file of non-verbal interaction preferences is transmitted at step 1056 to downstream recipients such as the CDM 274 at step 1058 and other applications 230 at step 1060.

In the upstream applications 230, at step 1062, the batch file is received. At step 1064, the preference changes contained in the batch file are then recorded. As discussed for step 1042, the at least one the at least one of the applications 230 upstream of the data privacy application 232 transmits the preference changes, via one or more batches, to the CIF 264. Substantially simultaneously, at step 1066, the user 110 may input non-verbal interaction preferences into the at least one of the applications 230 upstream of the data privacy application 232.

When the complete file may be accessed by one or more of the applications 230 such as a reading application and a setting application from step 1044, the one or more of the applications 230 are updated with the preference changes in step 1070. In step 1072, the preference changes inputted by the user 110 via the one or more of the applications 230 are transmitted to the CIF 264 as described at step 1066. In some embodiments, the preference changes may be transmitted one record at a time.

At step 1080, the data filter 272 transmits filter requirements to the EDL whole files 270 for pertinent non-verbal interaction preference settings. In the EDL whole files 270, a marketing file of a user data (i.e. the data 234 stored in the storage 224) may be compared to solicitation non-verbal interaction preferences, removes any non-verbal interaction preference profiles, and transmits the filtered marketing file of the user data to the data filter 272 at step 1082. At step 1084, the filtered marketing file of the user data is received by the data filter 272 having one or more non-verbal interaction preference accounts deleted therefrom. The filtered marketing file of the user data, at step 1086, is then transmitted to the marketing module 276, which is accessed and used by at least one of the agents 210. In certain embodiments, the marketing module 276, at step 1088, transmits a new campaign file to the data filter 272 so that the user data contained therein may be filtered using the non-verbal interaction preferences at step 1088.

In some embodiments, the method 1000 may be a verbal interaction control process (i.e., a "Do-Not-Call" (DNC) process) and include steps for controlling verbal interaction preferences of the users 110. As depicted in FIG. 8B, the data privacy application 232 may utilize and/or be in communication with the PPCM module 262, a customer information file (CIF) 264, at least one of the applications 230 upstream of the data privacy application 232, an enterprise data lake (EDL) 268, EDL whole files 270, a data filter 272, a custom data module (CDM) 274, at least one of the applications 230 downstream of the data privacy application 232, and a marketing module 276. It should be appreciated that the data privacy application 232 may utilize more or less of the applications 230 and/or the systems 202, 204 of the enterprise system 200.

In step 2002 of the method 2000, the user 110 executes the data privacy application 232 using the computing device 104 and/or the mobile device 106. In step 2004, the user 110 selects determines whether to log into the data privacy application 232 as an existing online banking authenticated user or as an unauthenticated user. An example of an input screen of a user interface is shown in FIG. 9. To proceed as the authenticated user, the user 110, in step 2006, inputs credentials into the data privacy application 232. Once the privacy data application 232 authenticates the credentials of the user 110, in step 2008, a personal dashboard is provided as shown in FIG. 10. The personal dashboard may include current verbal interaction preferences of the user 110.

From the personal dashboard, in step 2010, the user 110 selects which verbal interaction preferences and data to manage. When data sharing preferences are selected, the user 110, in step 2012, is then able to set those verbal interaction preferences, for example, the opt-out data sharing preferences shown in FIG. 11. Upon setting of the data sharing preferences, the user 110 submits the verbal interaction preferences. Thereafter, in step 2014, the user 110 receives confirmation that the verbal interaction preferences and data have been submitted. An example of a confirmation screen of the user interface is shown in FIG. 12. The user 110 may then close the selected verbal interaction preferences and data and return to manage other preferences and data, and/or logout of the data privacy application 232. When marketing preferences are selected, the user 110, in step 2016, is then able to set those verbal interaction preferences, for example, the opt-out marketing telephone calls shown in FIGS. 13 and 14. Upon setting of the marking preferences, the user 110 submits the verbal interaction preferences. Thereafter, in step 2018, which may be substantially similar to step 2014, the user 110 receives confirmation that the verbal interaction preferences and data have been submitted. An example of a confirmation screen of the user interface is shown in FIG. 15. The user 110 may then close the selected verbal interaction preferences and data and return to manage other preferences and data, and/or logout of the data privacy application 232.

When the user is logged in as an unauthenticated user or guest, a generic dashboard is provided as shown in FIG. 16. From the generic dashboard, the user 110, in step 2020, selects which verbal interaction preferences and data to manage. When data sharing preferences are selected, the user 110, in step 2022, is then prompted to enter personal information. One example of an input screen of the user interface is shown in FIG. 17. Once the personal information is entered, the user 110 is then able to set the data sharing preferences, for example, the opt-out data sharing preferences shown in FIG. 18. Upon setting of the data sharing preferences, the user 110 submits the verbal interaction preferences. Thereafter, the user 110, in step 2024, which is substantially similar to steps 2014, 2018, receives confirmation that the verbal interaction preferences and data have been submitted. An example of a confirmation screen of the user interface is shown in FIG. 19. The user 110 may then close the selected verbal interaction preferences and data and return to manage other preferences and data, and/or logout of the data privacy application 232. When marketing preferences are selected, the user 110, in step 2026, is not prompted for personal information, but is able to immediately set those verbal interaction preferences, for example, the opt-out marketing telephone calls shown in FIGS. 20 and 21. Upon setting of the marking preferences, the user 110 submits the verbal interaction preferences. Thereafter, the user 110, in step 2028, which is substantially similar to steps 2014, 2018, 2024, receives confirmation that the verbal interaction preferences and data have been submitted. An example of a confirmation screen of the user interface is shown in FIG. 22. The user may then close the selected verbal interaction preferences and data and return to manage other preferences and data, and/or logout of the data privacy application 232.

In step 2030, the verbal interaction preferences of the user 110 are then transmitted to the PPCM module 262, where they are received and recorded into the PPCM module 262 from APIs in step 2032. A PPCM manager of the PPCM module 262, at step 2034, may transmit at least a portion of the verbal interaction preferences as: i) a daily verbal interaction preferences delta file including the verbal interaction preference changes to at least one of the CIF 264 at step 2038; and/or ii) a daily full file to at least one of the EDL whole files 270 at step 2036. When the daily full file is transmitted to the EDL whole files 270 from the PPCM module 262 at step 2036, it may be received therein.

When the daily verbal interaction preferences delta file is transmitted to the CIF 264 from the PPCM module 262, it may be received and recorded therein at step 2038. The user 110, in step 2040, may communicate with a telephone call center (TCC), which may input verbal interaction preferences into the CIF 264. The recorded file stored in the CIF 264 may also be updated with the verbal interaction preferences received, via one or more batches, from the at least one of the applications 230 upstream of the data privacy application 232 at step 2042.

In the CIF 264, at step 2044, may transmit at least a portion of the verbal interaction preferences as: i) a daily full file to the EDL 268, at step 2047, for use by the at least one of the applications 230 downstream of the data privacy application 232; ii) a complete file to the storage 224 of the enterprise system 200 to be accessed by one or more of the applications 230 such as a reading application and a setting application; and/or iii) a batch file for use by the at least one of the applications 230 upstream of the data privacy application 232 at step 2062. At step 2048, the EDL 268 transmits the verbal interaction preferences as the daily data file to the PPCM module 262, which is then used at step 2032 described hereinabove.

At step 2054, the verbal interaction preference changes received by the EDL whole files 270 at step 2036 are recorded therein. Thereafter, the full file of verbal interaction preferences is transmitted at step 2056 to downstream recipients such as CDM 274 at step 2058 and other applications 230 at step 2060.

In the upstream applications 230, at step 2062, the batch file is received. At step 2064, the verbal interaction preference changes contained in the batch file are then recorded. As discussed for step 2042, the at least one the at least one of the applications 230 upstream of the data privacy application 232 transmits the verbal interaction preference changes, via one or more batches, to the CIF 264. Substantially simultaneously, at step 2066, the user 110 may input verbal interaction preferences into the at least one of the applications 230 upstream of the data privacy application 232.

When the complete file may be accessed by one or more of the applications 230 such as a reading application and a setting application from step 2044, the one or more of the applications 230 are updated with the verbal interaction preference changes in step 2070. In step 2072, the verbal interaction preference changes inputted by the user 110 via the one or more of the applications 230 are transmitted to the CIF 264 as described at step 2066. In some embodiments, the verbal interaction preference changes may be transmitted one record at a time.

At step 2080, the data filter 272 transmits filter requirements to the EDL whole files 270 for pertinent verbal interaction settings. In the EDL whole files 270, a marketing file of a user data (i.e. the data 234 stored in the storage 224) may be compared to solicitation verbal interaction preferences, removes any verbal interaction preference profiles, and transmits the filtered marketing file of the user data to the data filter 272 at step 2082. At step 2084, the filtered marketing file of the user data is received by the data filter 272 having one or more verbal interaction preference accounts deleted therefrom. The filtered marketing file of the user data, at step 2086, is then transmitted to the marketing module 276, which is accessed and used by at least one of the agents 210. In certain embodiments, the marketing module 276, at step 2088, transmits a new campaign file of the user data to the data filter 272 so that the data contained therein may be filtered using the verbal interaction preferences at step 2088.

In some embodiments, the method 3000 may be a no-interaction process (i.e., a "Right-To-Forget" (RTF) process) and include steps for controlling no-interaction preferences of the users 110. For example, applying privacy selections/consent against applicable rules sets (e.g. CPRA, Telephone Consumer Protection Act (TCPA), California Consumer Privacy Act (CCPA), global marketing, and the like). As depicted in FIG. 8C, the data privacy application 232 may utilize and/or be in communication with a personal data request module 261, the PPCM module 262, a customer information file (CIF) 264, at least one of the applications 230 upstream of the data privacy application 232, an enterprise data lake (EDL) 268, EDL whole files 270, a data filter 272, a custom data module (CDM) 274, at least one of the applications 230 downstream of the data privacy application 232, and a marketing module 276. It should be appreciated that the data privacy application 232 may utilize more or less of the applications 230 and/or the systems 202, 204 of the enterprise system 200.

In step 3002 of the method 3000, the user 110 executes the data privacy application 232 using the computing device 104 and/or the mobile device 106. In step 3004, the user 110 selects determines whether to log into the data privacy application 232 as an existing online banking authenticated user or as an unauthenticated user. An example of an input screen of a user interface is shown in FIG. 9. To proceed as the authenticated user, the user 110, in step 3006, inputs credentials into the data privacy application 232. At step 3007, the user 110 may determines whether to initiate a personal data request (PDR).

When the PDR is initiated, the privacy data application 232 authenticates the credentials of the user 110, and in step 3008, the user 110 may request deletion of personal information as no-interaction preferences. Then, in step 3009, the no-interaction preferences are transmitted to the PPCM module 262 via at least one API, where they are received and recorded into the PPCM module 262 in step 3032.

When the PDR is not initiated, the privacy data application 232 authenticates the credentials of the user 110, and in step 3010, a personal dashboard is provided as shown in FIG. 10. The personal dashboard may include current no-interaction preferences of the user 110. From the personal dashboard, in step 3011, the user 110 selects which no-interaction preferences and data to manage. When data sharing preferences are selected, the user 110, in step 3012, is then able to set those no-interaction preferences, for example, the opt-out data sharing preferences shown in FIG. 11. Upon setting of the data sharing preferences, the user 110 submits the no-interaction preferences. Thereafter, in step 3014, the user 110 receives confirmation that the no-interaction preferences and data have been submitted. An example of a confirmation screen of the user interface is shown in FIG. 12. The user 110 may then close the selected no-interaction preferences and data, and return to manage other preferences and data, and/or logout of the data privacy application 232. When marketing preferences are selected, the user 110, in step 3016, is then able to set those no-interaction preferences, for example, the opt-out marketing emails and telephone calls shown in FIGS. 13 and 14. Upon setting of the marking preferences, the user 110 submits the no-interaction preferences. Thereafter, in step 3018, which may be substantially similar to step 3014, the user 110 receives confirmation that the no-interaction preferences and data have been submitted. An example of a confirmation screen of the user interface is shown in FIG. 15. The user 110 may then close the selected no-interaction preferences and data and return to manage other preferences and data, and/or logout of the data privacy application 232.

When the user is logged in as an unauthenticated user or guest, a generic dashboard is provided as shown in FIG. 16. From the generic dashboard, the user 110, in step 3020, selects which no-interaction preferences and data to manage. When data sharing preferences are selected, the user 110, in step 3022, is then prompted to enter personal information. One example of an input screen of the user interface is shown in FIG. 17. Once the personal information is entered, the user 110 is then able to set the data sharing preferences, for example, the opt-out data sharing preferences shown in FIG. 18. Upon setting of the data sharing preferences, the user 110 submits the no-interaction preferences. Thereafter, the user 110, in step 3024, which is substantially similar to steps 3014, 3018, receives confirmation that the no-interaction preferences and data have been submitted. An example of a confirmation screen of the user interface is shown in FIG. 19. The user 110 may then close the selected no-interaction preferences and data and return to manage other preferences and data, and/or logout of the data privacy application 232. When marketing preferences are selected, the user 110, in step 3026, is not prompted for personal information, but is able to immediately set those no-interaction preferences, for example, the opt-out marketing emails and telephone calls shown in FIGS. 20 and 21. Upon setting of the marking preferences, the user 110 submits the no-interaction preferences. Thereafter, the user 110, in step 3028, which is substantially similar to steps 3014, 3018, 3024, receives confirmation that the no-interaction preferences and data have been submitted. An example of a confirmation screen of the user interface is shown in FIG. 22. The user may then close the selected no-interaction preferences and data and return to manage other preferences and data, and/or logout of the data privacy application 232.

In step 3030, the no-interaction preferences of the user 110 are then transmitted to the PPCM module 262, where they are received and recorded into the PPCM module 262 from APIs in step 3032. A PPCM manager of the PPCM module 262, at step 3034, may transmit at least a portion of the no-interaction preferences as a daily full file to at least one of the EDL whole files 270 at step 3036. When the daily full file is transmitted to the EDL whole files 270 from the PPCM module 262 at step 3036, it may be received therein. At step 3054, the no-interaction preference changes received by the EDL whole files 270 at step 3036 are recorded therein. Thereafter, the full file of no-interaction preferences is transmitted at step 3056 to downstream recipients such as CDM 274 at step 3058 and other applications 230 at step 3060.

At step 3080, the data filter 272 transmits filter requirements to the EDL whole files 270 for pertinent no-interaction preference settings. In the EDL whole files 270, a marketing file of a user data (i.e. the data 234 stored in the storage 224) may be compared to solicitation no-interaction preferences, removes any no-interaction preference profiles, and transmits the filtered marketing file of the user data to the data filter 272 at step 3082. At step 3084, the filtered marketing file of the user data is received by the data filter 272 having one or more no-interaction preference accounts deleted therefrom. The filtered marketing file of the user data, at step 3086, is then transmitted to the marketing module 276, which is accessed and used by at least one of the agents 210. In certain embodiments, the marketing module 276, at step 3088, transmits a new campaign file of the user data to the data filter 272 so that the data contained therein may be filtered using the no-interaction preferences at step 3088.

Figure 23:
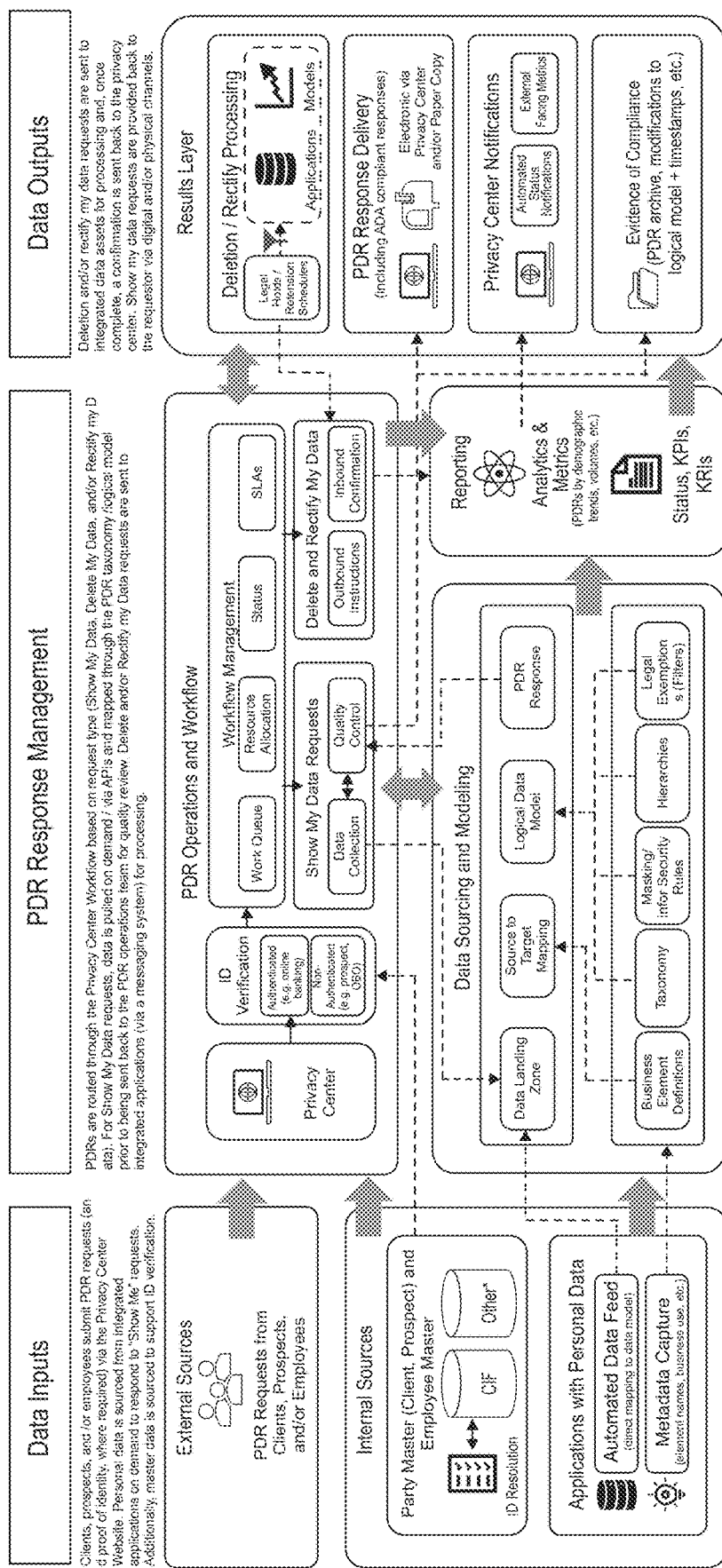
FIG. 23 is a graphical representation illustrating a data flow architecture of the personal data requests (PDR) fulfillment module of FIG. 2.

FIG. 23 is a graphical representation illustrating a data flow architecture of the PDR fulfillment module of FIG. 2. In some embodiments, the PDR fulfillment module includes various data inputs, a PDR response management, and various data outputs.

The data privacy application 232 may be a mechanism to control how the personal information is used, aligned with consent and preference management capabilities. It provides to the users 110 transparency into the personal information collected and how it is used as well as an understanding of how privacy and security are handled. The data privacy application 232 will enable compliance with regulatory requirements, build trust and secure market share, enabling a broader, more dynamic use of data. More importantly, the data privacy application 232 provides a positive user experience. Features of the data privacy application 232 are expandable as user expectations and privacy regulations evolve over time.

In an embodiment, the system 200 may be caused to define the one or more preferences for the sensitive data based at least on one of a plurality of preconfigured rules and contextual information. In an embodiment, the plurality of preconfigured rules may be defined based on a user input. Examples of preferences that may be defined for accessing one or more fields of the sensitive data may include access-time preference and access-type preference. The access-type preference may include at least one of allowing an access to the one or more fields, denying an access, allowing access upon consent from the user, a notification generation upon access, and various other preferences. In an embodiment, the access-time preference may include defining preferred time to call, preferred date of communication, Do-Not-Email, Do-Not-Call, and/or Right-To-Forget options, and other scheduled preferences. It is understood that the above-defined preferences are mentioned for example purposes and should not be considered as limiting to various embodiments of the disclosure.

In response to a change in the preferences, the system 200 may cause generation of a trigger notification notifying the user 110. In an embodiment, the system 200 may be caused to dynamically update the preferences associated with the personal information. In an embodiment, the system 200 may be caused to monitor behavior and responses of the user 110 pertaining to the preferences to dynamically update the preferences. In an embodiment, based on a learning of the behavior of the user 110, the system 200 may be caused to update one or more of the preferences.

Since the system 200 is extensible and flexible, the preferences defined herein are not static preferences, and can be updated by adding new preferences and/or deleting the existing preferences, or replacing the existing preferences with the new preferences. Also, for the preferences defined in the system 200, the system 200 can further define corresponding actions.

The use of the data privacy application 232 improves the efficiency of the human agents 210 and operation of the computing system 206 in various different respects. First, the disclosed method provides an ability for the human agents 210 to eliminate unnecessary calculations and communications relating to certain tasks performed by the human agents 210 and/or the computing system 206 that have been found to not have a positive impact on securing the desired product and/or service from the users 110. This may be especially relevant where such campaign materials are to be produced in hard copy form and mailed to the user 110, as extensive costs can be avoided by targeting the correct users 110. This results in the human agents 210 and the computing system 206 avoiding a waste of resources when performing certain tasks, such as sending unwanted communications of various forms to users 110 that will never interact with or benefit from the sending of such communications. Second, the use of the data privacy application 232 also allows for certain variables in the data 234 to be determined to be private and further allows for the computing system 206 to be simplified by means of the elimination of undesired interactions. Third, the data privacy application 232 provides the human agents 210 greater insight to improve the preferences of the users 110 with respect to a desired account setting. Each of the described advantages reduces network traffic as experienced by the computing system 206 due to the ability to target only those users 110 that have a greater probability of the engagement with the agents 210.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A system for managing data privacy, the system comprising:
   a computer with one or more processor and memory, wherein the computer executes computer-readable instructions for at least one interaction with at least one user device; and
   a network connection operatively connecting the at least one user device to the computer;
   wherein, upon execution of the computer-readable instructions, the computer is configured to:
   initiate providing, via a graphical user interface of the at least one user device, a user software application to a user for installation on the at least one user device, wherein the at least one user device is configured to wirelessly communicate with the computer via the user software application;
   initiate providing, via the graphical user interface of the at least one user device, a data privacy application to a user, wherein the at least one user device is configured to wirelessly communicate with the computer via the data privacy application;
   receive, via the user software application installed on the at least one user device, user data comprising personal information of the user;
   store the user data in at least one database;
   receive, via a user-specific personal dashboard of the data privacy application, at least one preference related to the user data, wherein the at least one preference is at least one marketing preference;

transmit, via the data privacy application, a communication to the at least one user device, wherein the communication includes a confirmation of the at least one preference;
store the at least one preference in the at least one database;
filter marketing data of the system based upon the at least one preference; and
use the filtered marketing data to prevent the at least one interaction with the at least one user device.

2. The system of claim 1, wherein the at least one preference is a no-interaction preference.

3. The system of claim 1, wherein, upon execution of the computer-readable instructions, the computer is further configured to provide the at least one preference to at least one application separate from the data privacy application.

4. The system of claim 1, wherein, upon execution of the computer-readable instructions, the computer is further configured to filter the user data based upon the at least one preference.

5. The system of claim 4, wherein a filtered user data is provided to a marketing module.

6. The system of claim 1, wherein, upon execution of the computer-readable instructions, the computer is further configured to filter a marketing file of the user data based upon the at least one preference.

7. The system of claim 6, wherein the filtered marketing file of the user data is provided to a marketing module.

8. The system of claim 6, wherein the filtered marketing file is used by at least one agent when distributing marketing materials.

9. A method for managing data privacy, comprising the steps of:
providing a computer with one or more processor and memory, wherein the computer executes computer-readable instructions for at least one interaction with at least one user device, and a network connection operatively connecting the at least one user device to the computer;
providing, via a graphical user interface of the at least one user device, a user software application to a user for installation on the at least one user device, wherein the at least one user device is configured to wirelessly communicate with the computer via the user software application;
providing, via the graphical user interface of the at least one user device, a data privacy application to a user, wherein the at least one user device is configured to wirelessly communicate with the computer via the data privacy application;
receiving, via the user software application installed on the at least one user device, user data comprising personal information of the user;
storing the user data in at least one database;
receiving, via a user-specific personal dashboard of the data privacy application, at least one preference related to the user data, wherein the at least one preference is at least one marketing preference;
transmitting, via the data privacy application, a communication to the at least one user device, wherein the communication includes a confirmation of the at least one preference;
storing the at least one preference in the at least one database;
filter marketing data of the system based upon the at least one preference; and
using the filtered marketing data to prevent at least one interaction with the at least one user device.

10. The method of claim 9, wherein the at least one preference is a no-interaction preference.

11. The method of claim 9, further comprising the step of filtering the user data based upon the at least one preference.

12. The method of claim 11, wherein a filtered user data is provided to a marketing module.

13. The method of claim 11, wherein the filtering step deletes personal information of a user from the user data.

14. The method of claim 9, further comprising the step of filtering a marketing file of the user data based upon the at least one preference.

15. The method of claim 14, wherein the filtered marketing file of the user data is provided to a marketing module.

16. The method of claim 14, wherein the filtering step deletes personal information of a user from the marketing file of the user data.

17. The method of claim 14, wherein the filtered marketing file is used by at least one agent when distributing marketing materials.

* * * * *